United States Patent
Higuchi et al.

(10) Patent No.: US 12,065,535 B2
(45) Date of Patent: Aug. 20, 2024

(54) POLYMER, COMPOSITION, ELECTROCHROMIC ELEMENT, DIMMING DEVICE, AND DISPLAY DEVICE

(71) Applicant: NATIONAL INSTITUTE FOR MATERIALS SCIENCE, Tsukuba (JP)

(72) Inventors: Masayoshi Higuchi, Tsukuba (JP); Manas Kumar Bera, Tsukuba (JP)

(73) Assignee: NATIONAL INSTITUTE FOR MATERIALS SCIENCE, Tsukuba (JP)

( * ) Notice: Subject to any disclaimer, the term of this patent is extended or adjusted under 35 U.S.C. 154(b) by 810 days.

(21) Appl. No.: 17/267,711

(22) PCT Filed: Aug. 15, 2019

(86) PCT No.: PCT/JP2019/032009
§ 371 (c)(1),
(2) Date: Feb. 10, 2021

(87) PCT Pub. No.: WO2020/040026
PCT Pub. Date: Feb. 27, 2020

(65) Prior Publication Data
US 2021/0317260 A1   Oct. 14, 2021

(30) Foreign Application Priority Data
Aug. 21, 2018 (JP) ................ 2018-154378

(51) Int. Cl.
*C08G 61/12* (2006.01)
*C09K 9/02* (2006.01)
(Continued)

(52) U.S. Cl.
CPC .............. *C08G 61/122* (2013.01); *C09K 9/02* (2013.01); *G02F 1/15165* (2019.01);
(Continued)

(58) Field of Classification Search
CPC ... C08G 61/122; G02F 1/155; G02F 1/15165; H05B 45/10; C09K 9/02
See application file for complete search history.

(56) References Cited

U.S. PATENT DOCUMENTS

2009/0270589 A1* 10/2009 Higuchi ............... C07D 213/53
359/321

FOREIGN PATENT DOCUMENTS

EP 3623865 A1 3/2020
JP 10081754 A * 3/1998 ............. C08G 61/12
(Continued)

OTHER PUBLICATIONS

International Preliminary Report on Patentability for Application No. PCT/JP2019/032009, dated Mar. 4, 2021, including English translation, 15 pages.
(Continued)

*Primary Examiner* — Bijan Ahvazi
(74) *Attorney, Agent, or Firm* — Crowell & Moring LLP

(57) ABSTRACT

The present invention addresses a first problem of providing a polymer that has electrochromic characteristics, and that can form a sheet which seems more transparent when applied to an electrochromic element and is decolored. The present invention for solving the problem is a polymer obtained by forming a complex between, and binding together, compound A represented by formula 1: BP1-L1-BP2 and at least one specific metal ion selected from the group consisting of first metal ions having a coordination number of 4, second metal ions having a coordination number of 6, and third metal ions having a coordination number of 4 and 6. In the formula, L1 represents a single bond or a divalent group, and BP1 and BP2 may be identical or different from each other and each independently represent a bipyridine derivative.

12 Claims, 19 Drawing Sheets

(51) Int. Cl.
*G02F 1/1516* (2019.01)
*G02F 1/155* (2006.01)
*H05B 45/10* (2020.01)

(52) U.S. Cl.
CPC ....... *G02F 1/155* (2013.01); *C08G 2261/376* (2013.01); *C09K 2211/187* (2013.01); *H05B 45/10* (2020.01)

(56) References Cited

FOREIGN PATENT DOCUMENTS

| | | | |
|---|---|---|---|
| JP | H10-81754 A | 3/1998 | |
| JP | 2007-112957 A | 5/2007 | |
| JP | 2008-150365 A | 7/2008 | |
| JP | 2009-167162 A | 7/2009 | |
| JP | 2018-145244 A | 9/2018 | |
| WO | WO 2018-207591 A1 | 11/2018 | |
| WO | WO 2019/177160 A1 | 9/2019 | |

OTHER PUBLICATIONS

Office Action in Japan Application No. 2020-538339, including English translation, dated Aug. 12, 2021, 7 pages.

Office Action in China Application No. 2019800505079, including English translation, dated Dec. 23, 2021, 36 pages.

Li-Jing Yang, Qing-Ling Liu, Yang-Hui Luo. Counter-anions-tuned crystal structure and intermolecular interactions of a series of iron (II) complexes derived from 4,4"-dimethyl-2,2"-bipyridine. Molecular Crystals and Liquid Crystals, pp. 132-142, dated Jul. 12, 2016.

Stephen Boyde, Geoffrey F, Strouse., Effect on MLCT Excited States of Electronic Delocalization in the Acceptor Ligand, J. Am. Chem. Soc.,pp. 7396-7398, dated Sep. 26, 1990.

John R. Shaw, Ralph T. Webb, and Russell H Schmehl, Intersystem Crossing to both Ligand-Localized and Charge-Transfer Excited States in Mononuclear and Dinuclear Ruthenium (II) Diimine Complexes, J. Am. Chem. Soc., pp. 1117-1123, dated Jan. 31, 1990.

Extended European search report in Europe Application No. 19851416.8 dated May 2, 2022, 7 pages.

Bera et al., "Construction of Coordination Nanosheets Based on Tris (2,2"-bypyridine)-Iron (Fe2+) Complexes as Potential Electrochromic Materials", ACS Appl. Mater. Interfaces, Apr. 6, 2019, 11, 11893-11903, 11 pages.

International Search Report in Application No. PCT/JP2019/032009, dated Oct. 15, 2019, 2 pages.

* cited by examiner

POLYMER, COMPOSITION, ELECTROCHROMIC ELEMENT, DIMMING DEVICE, AND DISPLAY DEVICE

This application is a 371 application of PCT/JP2019/032009 having an international filing date of Aug. 15, 2019, which claims priority to JP2018-154378 filed Aug. 21, 2018, the entire content of each of which is incorporated herein by reference.

TECHNICAL FIELD

The present invention relates to a polymer (complex), a composition, an electrochromic element, a light control device, and a display device.

BACKGROUND ART

Recently, development of a light control device having an electrochromic element using a compound having electrochromic properties, a display device, and the like has progressed.

Patent Literature 1 describes a polymer material containing a bis(terpyridine) derivative, a metal ion, and a counter anion.

CITATION LIST

Patent Literature

Patent Literature 1: JP-A-2007-112957

SUMMARY OF INVENTION

Technical Problem

An electrochromic element in which a sheet formed of the material described in Patent Literature 1 is arranged between a pair of transparent electrodes can easily control color development and decolorization by controlling the potential, and has excellent properties. On the other hand, the inventors of the present invention have found that the sheet of the electrochromic element may look cloudy when decolored, and there is room for improvement.

Therefore, an object of the present invention is to provide a polymer (complex) that has electrochromic properties and can form a sheet which appears more transparent when applied to an electrochromic element and decolored.

Further, another object of the present invention is to provide a composition containing such a polymer, an electrochromic element containing a composition layer formed from the composition, a light control device, and a display device.

Solution to Problem

Various aspects of the present invention for solving the above problems are as follows.

[1]. A polymer, wherein the polymer is comprised of a complex where a compound A represented by formula 1 below is bound to at least one specific metal ion selected from the group consisting of a first metal ion having a coordination number of 4, a second metal ion having a coordination number of 6, and a third metal ion having coordination numbers of 4 and 6:

$$BP_1-L_1-BP_2 \tag{1}$$

wherein $L_1$ represents a single bond or a divalent group, and $BP_1$ and $BP_2$ each independently represent a bipyridine derivative, which may be identical to or different from each other.

[2]. The polymer according to the item [1], wherein the compound A is represented by formula 2 below:

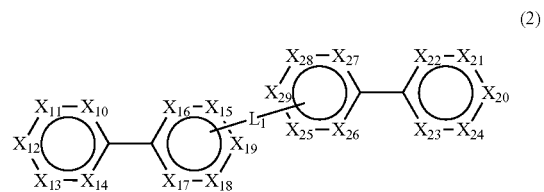

(2)

wherein, one of $X_{10}$ to $X_{14}$ is N, the rest are CR, one of $X_{15}$ to $X_{19}$ is N, another one of $X_{15}$ to $X_{19}$ is a carbon atom bonded to $L_1$, the rest are CR, one of $X_{20}$ to $X_{24}$ is N, the rest are CR, one of $X_{25}$ to $X_{29}$ is N, another one of $X_{25}$ to $X_{29}$ is a carbon atom bonded to $L_1$, the rest are CR, R is a hydrogen atom or a monovalent group, and $L_1$ is a single bond or a divalent group.

[3]. The polymer according to the item [1] or [2] comprising at least one selected from the group consisting of a repeating unit represented by formula 4 below and a partial structure represented by formula 5 below:

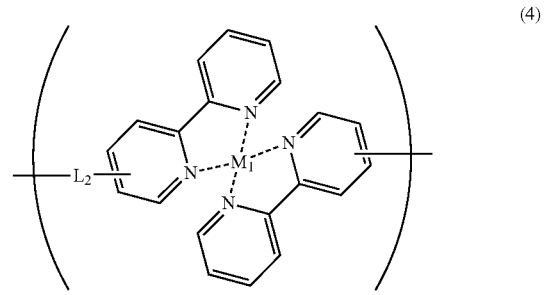

(4)

wherein $M_1$ represents at least one selected from the group consisting of the first metal ion and the third metal ion, which are metal ions in a state having a coordination number of 4, $L_2$ represents a single bond or a divalent group, a plurality of $L_2$ and $M_1$ may be identical to or different from each other, and hydrogen atoms bonded to carbon atoms of $L_2$ and $M_1$ may be each independently substituted with a monovalent group;

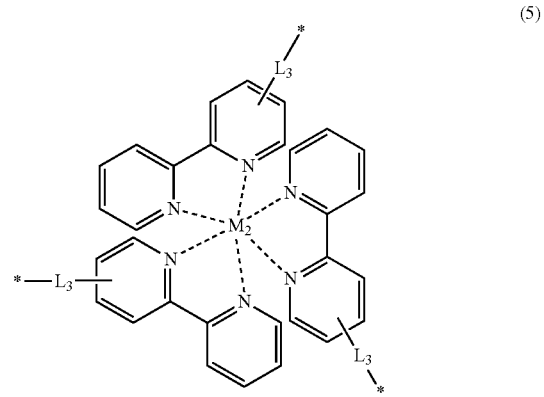

(5)

wherein $M_2$ represents at least one selected from the group consisting of the second metal ion and the third metal ion, which are metal ions in a state having a coordination number of 6, $L_3$ represents a single bond or a divalent group, * represents a bonding position, and a plurality of $M_2$ and $L_3$ may be identical to or different from each other, and hydrogen atoms bonded to carbon atoms of $M_2$ and $L_3$ may be each independently substituted with a monovalent group.

[4]. A composition comprising: the polymer according to any one of the above items [1] to [3]; and a counterion.

[5]. An electrochromic element comprising: a pair of electrodes arranged to face each other, at least one of which is transparent; and a composition layer formed from the composition according to claim 4 arranged between the pair of electrodes.

[6]. The electrochromic element according to the above item [5], further comprising a solid electrolyte layer between one of the electrodes and the composition layer.

[7]. A light control device including the electrochromic element according to the above item [5] or [6], where both of the pair of electrodes are transparent.

[8]. A display device comprising the electrochromic element according to the above item [5] or [6].

Advantageous Effects of Invention

According to the present invention, it is possible to provide a polymer (complex) that has electrochromic properties and can form a sheet which appears more transparent when applied to an electrochromic element and decolored.

Further, according to the present invention, it is also possible to provide a composition containing such a polymer, an electrochromic element containing a composition layer formed from the composition, a light control device, and a display device.

DESCRIPTION OF EMBODIMENTS

Figure 1:
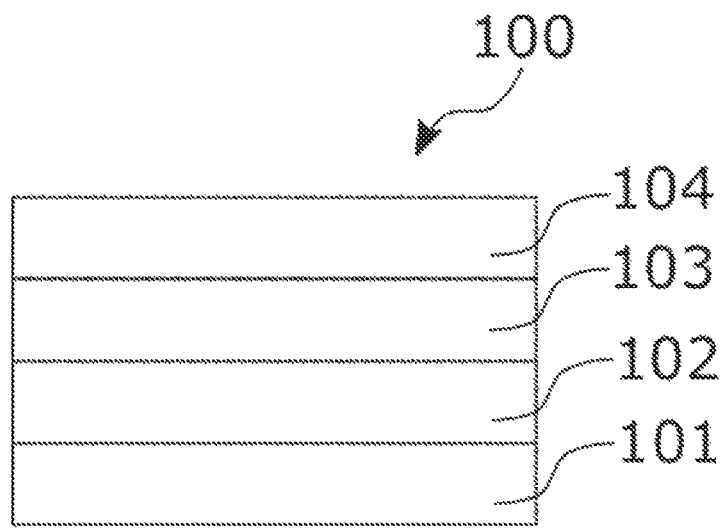
FIG. 1 is a conceptual view of an electrochromic element according to one embodiment of the present invention.

Hereinafter, the present invention will be described in detail.

The following description about the elements of the invention may be made based on typical embodiments of the present invention, however the present invention is not limited to such embodiments.

In the present specification, the numerical range expressed with "to" means a range including the numerical values before and after "to" as the lower limit and the upper limit.

In the present specification, regarding the expression of a group (group of atoms), an expression of a group that is not described as substituted or unsubstituted includes both a group not having any substituent and a group having a substituent, within the range that does not impair the effects of the present invention. For example, the expression of "an alkyl group" includes not only an alkyl group not having any substituent (unsubstituted alkyl group) but also an alkyl group having a substituent (substituted alkyl group). This explanation also applies to respective compounds mentioned in the following description.

[Polymer]

The polymer according to an embodiment of the present invention is a polymer obtained by forming a complex of a compound represented by formula 1 described later (hereinafter, also referred to as "compound A") with at least one specific metal ion selected from the group consisting of a first metal ion having a coordination number of 4, a second metal ion having a coordination number of 6, and a third metal ion having coordination numbers of 4 and 6 so as to be bound to each other.

The mechanism by which the above polymer exerts the effects of the present invention is not always clear, but the inventors of the present invention speculate as follows. Note that the following mechanism is speculative, and even a case in which the effects of the present invention are obtained by a mechanism other than the following mechanism shall be included in the scope of the present invention.

The inventors of the present invention have diligently examined why, in the electrochromic element in which a sheet formed of the material described in Patent Literature 1 is arranged between a pair of electrodes (typically between transparent electrodes), the sheet looks cloudy when decolored.

As a result, they have found that irregular and fine pores may be generated inside the formed sheet, and the pores scatter the incident light from the outside and the sheet looks cloudy.

The inventors of the present invention have intensively studied the synthesis of polymers (organic/inorganic hybrid polymers) by successive binding of various organic ligands via metal ions (by coordination binding), formation of sheets containing the polymers described above, observation of structures and electrochromic properties of the polymers, and the like, in order to further suppress the generation of fine pores inside the sheet.

As a result, they have found that, in the case of a sheet obtained by using a polymer formed by coordinating the compound A, which is a bis(bipyridine) derivative, to a specific metal ion, irregular pores are less likely to be generated inside the sheet, and an electrochromic material to which the resulting sheet is applied appears more transparent even when decolored, and they have completed the present invention.

As will be described later, the polymer according to the present invention is formed such that the compound A, which is a bis(bipyridine) derivative, is coordinated to a specific metal ion and they bind together. It is assumed that the compound A has a planar structure when coordinated to the specific metal ion. Due to this, there are fewer irregular pores inside the sheet containing the polymer. As a result, when the sheet is applied to an electrochromic element, it appears more transparent when decolored (easily transmits external light and is less likely to scatter).

Figure 18:
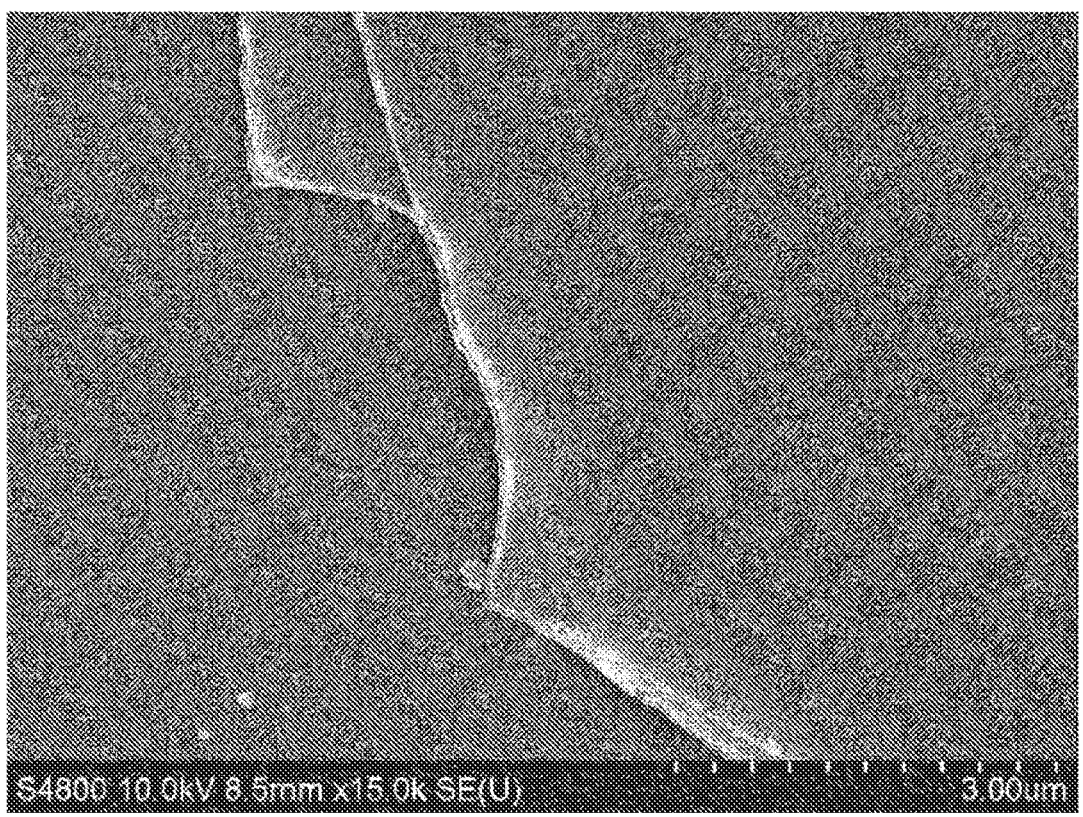
FIG. 18 is a scanning electron microscope image of the composition 1.
Figure 20:
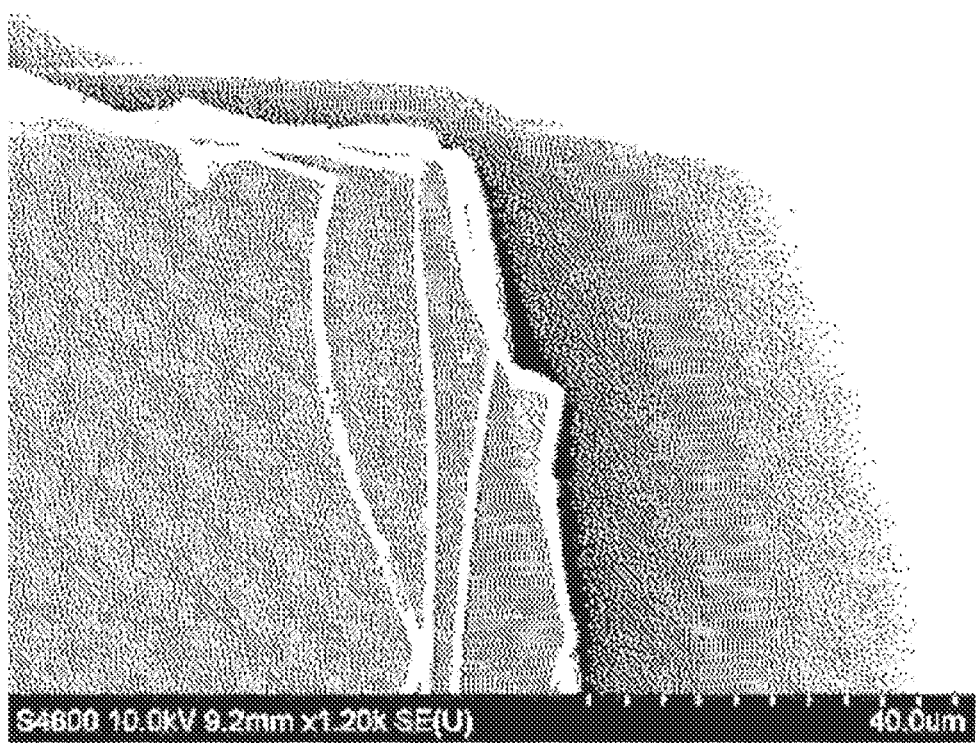
FIG. 20 is a scanning electron microscope image of the composition 2.

It is assumed that the fact that the polymer tends to have a planar structure is supported, as will be described later, from a point of view that the sheet containing the polymer according to one embodiment of the present invention has a nanosheet structure as shown in FIG. 18 or FIG. 20.

Hereinafter, the polymer according to the present invention will be described in detail.

[Compound A]

The polymer described above is a polymer in which the compounds A are bound to a specific metal ion to form a complex. Therefore, the compounds A can also be called a ligand, and also has a function as a monomer in relation to the polymer.

$$BP_1\text{-}L_1\text{-}BP_2 \tag{1}$$

In the formula, $L_1$ represents a single bond or a divalent group, and $BP_1$ and $BP_2$ each independently represent a bipyridine derivative, which may be identical to or different from each other.

The bipyridine derivatives of $BP_1$ and $BP_2$ are not particularly limited, and may be each independently 2,2'-bipyridine, 3,3'-bipyridine, 4,4'-bipyridine, 2,3'-bipyridine, 2,4'-bipyridine, 3,4'-bipyridine, and a compound in which at least one of hydrogen atoms bonded to carbon atoms of these derivatives is substituted with a monovalent group (the monovalent group does not include a pyridyl group). From a point of view that the polymer has more excellent effects of the present invention, 2,2'-bipyridine, or a compound in which at least one of hydrogen atoms bonded to the carbon atoms of 2,2'-bipyridine is substituted with a monovalent group (the monovalent group does not include a pyridyl group) is preferable. The monovalent group is not particularly limited, and the substituent W described later is preferable.

In formula 1 above, the divalent group of $L_1$ is not particularly limited, and is preferably a divalent unsaturated hydrocarbon group from a point of view that the response rate of electrochromism is accelerated due to the wider conjugated system owing to π electrons.

The form of the divalent unsaturated hydrocarbon group of $L_1$ is not particularly limited. For example, a divalent group derived from an alkenylene group, an alkynylene group, an arylene group, a heteroarylene group, and a condensed aromatic heterocycle in which three or more rings are condensed, and a group obtained by combining these groups are preferable.

Examples of the alkenylene group include a vinylene group, a propenylene group, a butenylene group, a pentenylene group, a 1-methylvinylene group, a 1-methylpropenylene group, a 2-methylpropenylene group, a 1-methylpentenylene group, and a 3-methylpentenylene group, a 1-ethylvinylene group, a 1-ethylpropenylene group, a 1-ethylbutenylene group, a 3-ethylbutenylene group, and the like. Among these groups, a vinylene group is preferable.

Examples of the alkynylene group include an ethynylene group, a 1-propynylene group, a 1-butynylene group, a 1-pentynylene group, a 1-hexynylene group, a 2-butynylene group, a 2-pentynylene group, a 1-methyl ethynylene group, a 3-methyl-1-propynylene group, a 3-methyl-1-butynylene group, and the like. Among these groups, an ethynylene group is preferable.

Examples of the arylene group include an o-phenylene group, an m-phenylene group, a p-phenylene group, a naphthalenediyl group, an anthracendiyl group, a naphthacenediyl group, a pyrenediyl group, a naphthylnaphthalenediyl group, a biphenyldiyl group (for example, a [1,1'-biphenyl]-4,4'-diyl group, a 3,3'-biphenyldiyl group, a 3,6-biphenyldiyl group, or the like), a terphenyldiyl group, a quaterphenyldiyl group, a quinquephenyldiyl group, a sexiphenyldiyl group, a septiphenyldiyl group, an octiphenyldiyl group, a nobiphenyldiyl group, a deciphenyldiyl group, and the like. Among these groups, an o-phenylene group or a p-phenylene group is preferable.

Examples of the heteroarylene group include a group containing at least one atom selected from the group consisting of O and S as a heteroatom. Specific examples thereof include divalent groups derived from a thiophene ring, a dibenzofuran ring, a dibenzothiophene ring, and the like.

The divalent group derived from a condensed aromatic heterocycle in which three or more rings are condensed is preferably a condensed aromatic heterocyclic ring in which at least one heteroatom selected from the group consisting of O and S is contained as an element constituting a condensed ring. Specific examples thereof include divalent groups derived from a dibenzofuran ring, a dibenzothiophene ring, a naphthofuran ring, a naphthothiophene ring, a benzodifuran ring, a benzodithiophene ring, a naphthodifuran ring, a naphthodithiophene ring, an anthrafuran ring, an anthradifuran ring, an anthrathiophene ring, an anthradithiophene ring, a thianthrene ring, a phenoxathiin ring, a thiophanthrene ring (naphthothiophene ring), and the like.

More specifically, the divalent unsaturated hydrocarbon group is preferably, for example, at least one group selected from the group consisting of a vinylene group, an ethynylene group, an o-phenylene group, a p-phenylene, a thienyl group (a divalent group derived from a thiophene ring), and a group obtained by combining these groups, from a point of view of having a faster response rate when applied to the electrochromic element.

Further, examples of another form of the divalent group of $L_1$ include a chalcogen atom, a heterohydrocarbon group containing a chalcogen atom, and the like. Specific examples thereof include O, S, an alkyleneoxy group, an alkylenethio group, and a group obtained by combining these groups.

In addition, the divalent group of $L_1$ may be a divalent group represented by the following formula. In the following formula, "*" represents a bonding position. Further, in the following divalent groups, the hydrogen atom bonded to each carbon atom may be substituted with a monovalent group, and examples of the monovalent group include the substituent W described later.

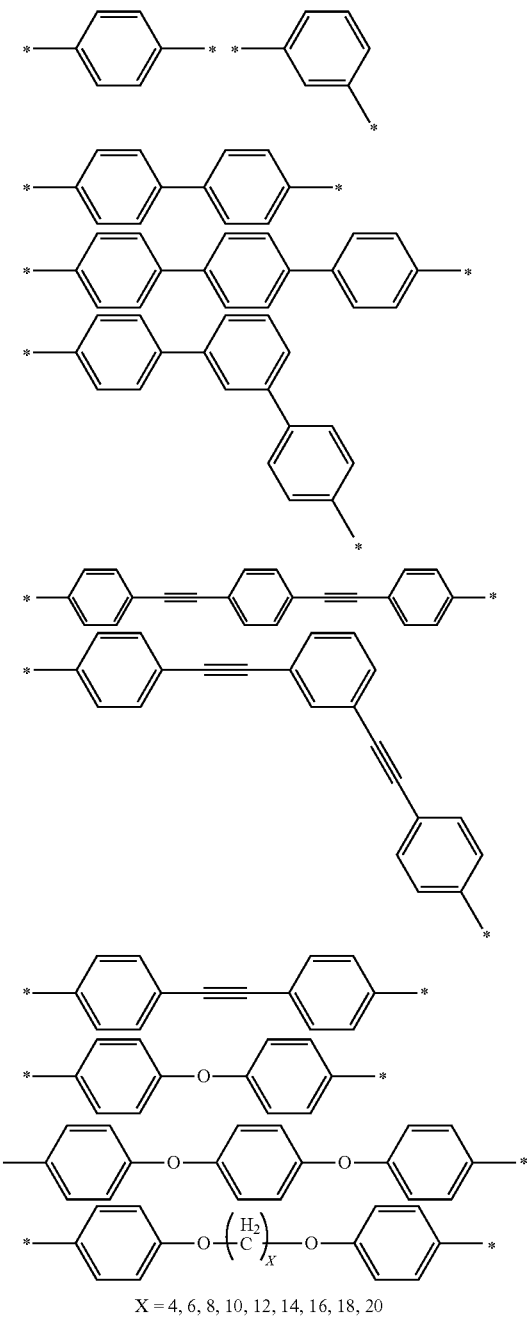

X = 4, 6, 8, 10, 12, 14, 16, 18, 20

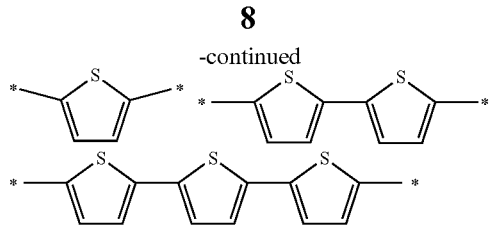

As the compound A, a compound represented by the following formula 2 is preferable.

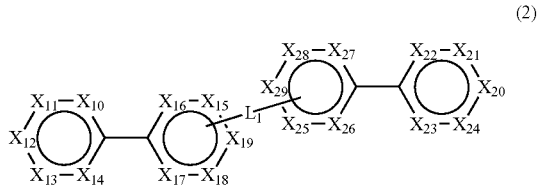

(2)

In the formula, one of $X_{10}$ to $X_{14}$ is N, the rest are CR, one of $X_{15}$ to $X_{19}$ is N, another one of $X_{15}$ to $X_{19}$ is a carbon atom bonded to $L_1$, the rest are CR, one of $X_{20}$ to $X_{24}$ is N, the rest are CR, one of $X_{25}$ to $X_{29}$ is N, another one of $X_{25}$ to $X_{29}$ is a carbon atom bonded to $L_1$, the rest are CR, R is a hydrogen atom or a monovalent group, and $L_1$ is a single bond or a divalent group.

Particularly, a compound represented by the following formula 3 is more preferable as the compound A from a point of view that a polymer having a more excellent effect of the present invention can be obtained.

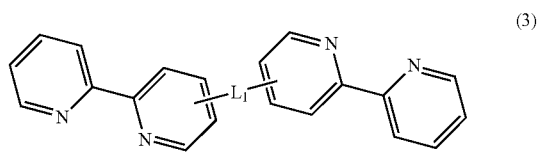

(3)

In the formula, $L_1$ represents a single bond or a divalent group, and has a similar form to that already described as $L_1$ in the formula 1. Further, in the above formula, the hydrogen atom bonded to each carbon atom may be substituted with a monovalent group (not including a pyridyl group), and the monovalent group is not particularly limited, and the substituent W described later is preferable.

[Specific Metal Ion]

The polymer according to the present invention is a polymer formed in such a manner that the compounds A form a complex with a specific metal ion, in other words, the compounds A are continuously bound to each other via a specific metal ion.

The specific metal ion is at least one selected from the group consisting of the first metal ion having a coordination number of 4 (which means a metal ion in a state having a coordination number of 4), the second metal ion having a coordination number of 6 (which means a metal ion in a state having a coordination of 6), and the third metal ion having coordination numbers of 4 and 6 (which means a metal ion capable of being both in a state having a coordination number of 4 and a state having a coordination number of 6).

As the specific metal ion, one kind may be used or two or more kinds thereof may be used in combination.

(First Metal Ion)

The first metal ion is not particularly limited, and examples thereof include Pd, Au, Zn, and the like. More specific examples thereof include ions such as Pd (II), Au (III), Zn (II), and the like. From a point of view that electrochromic properties are more easily exhibited, a metal ion that can be electrochemically oxidized and reduced is preferable. More specifically, Zn (II) or the like is preferable.

(Second Metal Ion)

The second metal ion is not particularly limited, and examples thereof include Mg, Al, Cr, Mn, Fe, and the like. More specific examples thereof include ions such as Mg (II), Al (III), Cr (III), Mn (II), Mn (III), Fe (II), and Fe (III), Os (II), and Os (III). From a point of view that electrochromic properties are more easily exhibited, a metal ion that can be electrochemically oxidized and reduced is preferable. More specifically, Fe (II), Fe (III), Os (II), and Os (III), and the like are preferable.

(Third Metal Ion)

The third metal ion means a metal ion that can take either a state having a coordination number of 4 or a state having a coordination number of 6. Such a metal ion is not particularly limited, and examples thereof include Cu, Co, and Pt. More specific examples thereof include Cu (I), Cu (II), Co (II), Co (III), Pt (II), Pt (IV), and the like. Among them, a metal ion that can be electrochemically oxidized and reduced is preferable from a point of view that electrochromic properties are more easily exhibited. More specifically, Cu (I), Cu (II), Co (II), Co (III), and the like are preferable.

[Structure of Polymer]

The polymer according to the present invention is formed in such a manner that one of the two bipyridine derivative moieties ($BP_1$ and $BP_2$) of one of the compounds A and one of the two bipyridine derivative moieties of another one of the compounds A form a complex with a specific metal ion, and as a result, the bipyridine derivative moieties are continuously bound to each other via the specific metal ion.

At this time, when the polymer contains the second metal ion and/or the third metal ion (in a state having a coordination number of 6), the three compounds A are coordinate-bound around the metal ions. As a result, a branched-chain structure is formed.

On the other hand, when the polymer contains the first metal ion and/or the third metal ion (in a state having a coordination number of 4) as specific metal ions, the two compounds A are coordinate-bound around the metal ions. As a result, a linear structure is formed. Further, the cyclic structure may be formed by combining the linear structure and the branched-chain structure.

The structure of the polymer according to the present invention may be linear, branched, or cyclic. It is preferable that the obtained sheet contains the second metal ion and/or the third metal ion (in a state having a coordination number of 6), that is, has at least a branched-chain structure, from a point of view that the obtained sheet has more excellent organic solvent resistance.

(Preferable Form of Polymer)

From a point of view that a polymer having a more excellent effect of the present invention can be obtained, the polymer preferably has at least one selected from the group consisting of a repeating unit represented by formula 4 below (hereinafter, also referred to as "unit 4") and a partial structure represented by formula 5 below (hereinafter, also referred to as "partial structure 5").

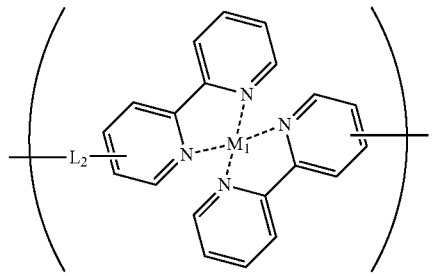

In the formula, $M_1$ represents at least one selected from the group consisting of the first metal ion and the third metal ion (in a state having a coordination number of 4), $L_2$ represents a single bond or a divalent group, some $L_2$ and $M_1$ may be identical to or different from each other, and the hydrogen atom bonded to each carbon atom may be each independently substituted with a monovalent group.

Note that the divalent group of $L_2$ is not particularly limited, and the group already described as $L_1$ in formula 1 is preferable. Further, the forms of the first metal ion and the third metal ion (in a state having a coordination number of 4) of $M_1$ are not particularly limited, and are as described above.

From a point of view that a polymer having a more excellent effect of the present invention can be obtained, it is preferable that $M_1$ is a metal ion of at least one metal selected from the group consisting of Pd, Au, Zn, Cu, Co, and Pt (in a state having a coordination number of 4).

Further, the monovalent group is not particularly limited, and the substituent W described later is preferable.

Note that the repeating unit is formed by coordinating the compound A to the first metal ion and/or the third metal ion (in a state having a coordination number of 4).

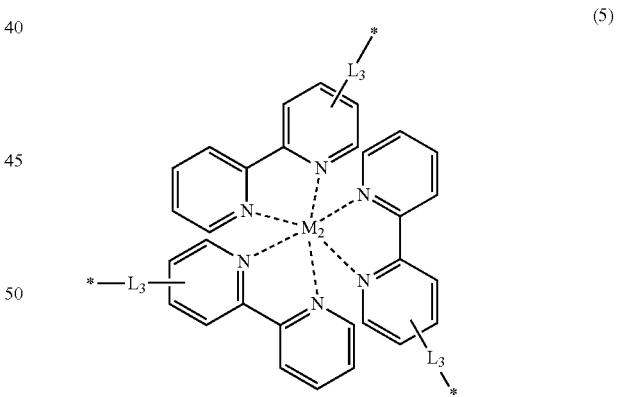

In the formula, $M_2$ represents the second metal ion and/or the third metal ion (in a state having a coordination number 6), $L_3$ represents a single bond or a divalent group, * represents a bonding position, plural $M_2$ and $L_3$ may be identical to or different from each other, and the hydrogen atom bonded to each carbon atom may be each independently substituted with a monovalent group.

The divalent group of $L_3$ is not particularly limited, and the group already described as $L_1$ in formula 1 is preferable. Further, the forms of the second metal ion and the third metal ion (in a state having a coordination number of 6) of $M_2$ are not particularly limited, and are as described above.

Particularly, it is preferable that the metal ion of $M_2$ is a metal ion of at least one metal selected from the group consisting of Mg, Al, Cr, Mn, Fe, Cu, Co, Os, and Pt (in a state having a coordination number of 6), from a point of view that a polymer having a more excellent effect of the present invention can be obtained.

Further, the monovalent group is not particularly limited, and the substituent W described later is preferable.

Note that the partial structure is formed by coordinating the compound A to the second metal ion and/or the third metal ion (in a state having a coordination number of 6).

The polymer according to one embodiment of the present invention has at least one selected from the group consisting of the unit 4 and the partial structure 5 described above. Hereinafter, the repeating unit and the partial structure are collectively referred to as a "specific structure".

The structure of the polymer according to the above embodiment is not particularly limited as long as it has a specific structure, and may contain only the unit 4 or may contain only the partial structure 5. When the polymer contains the unit 4 and the partial structure 5, the bonding order of the unit 4 and the partial structure 5 is not particularly limited. For example, as represented by formula 6 below, the ends of the linear oligomer formed by the unit 4 are bonded to the partial structure 5, respectively, and as a result, a branched chain structure may be formed. Further, a plurality of the following structures may be contained in the polymer molecule.

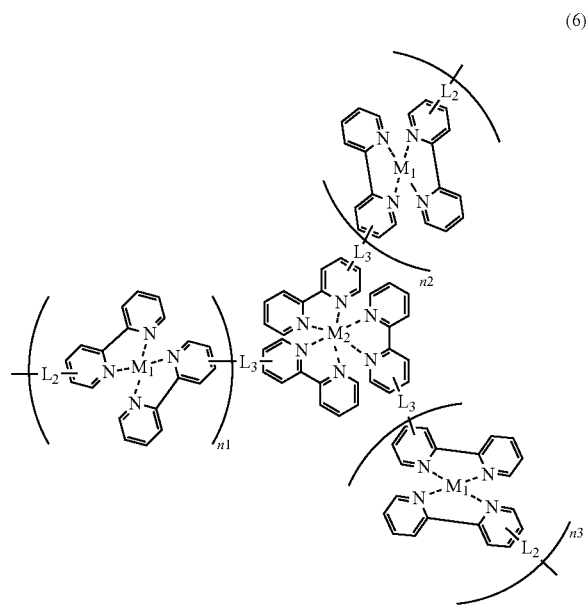

(6)

In the formula, $M_1$ and $L_2$ are similar to $M_1$ and $L_2$ in formula 4, respectively, and $M_2$ and $L_3$ are similar to $M_2$ and $L_3$ in formula 5, respectively.

Further, n1, n2, and n3 each represent integers of 1 or more.

Further, the polymer may have a multi-branched structure formed by connecting the partial structures 5 to each other. Examples of the multi-branched structure include a structure represented by the following formula 7.

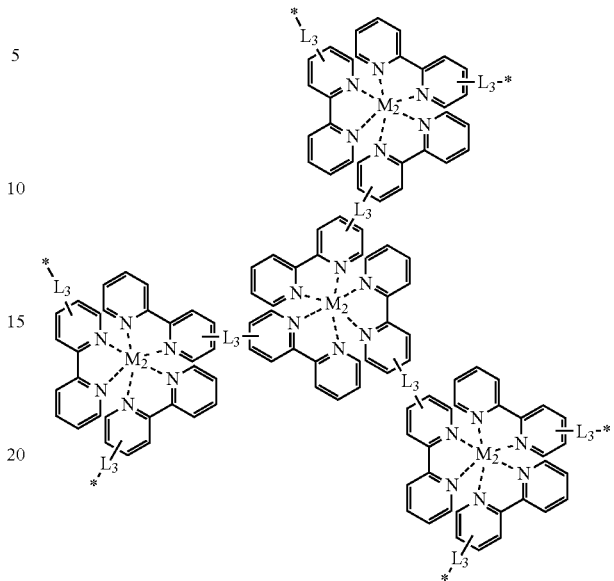

(7)

In the formula, $M_2$ and $L_3$ are similar to $M_2$ and $L_3$ in formula 5, respectively. Further, * represents a bonding position.

The polymers represented by formulas 6 and 7 described above are examples, and the polymer according to the present invention is not limited thereto.

The above polymer is typically insoluble in a commonly used solvent, and it is difficult to measure a molecular weight of the polymer by a general molecular weight measurement method such as Gel Permeation Chromatography (GPC). The shape of the polymer can be confirmed with a scanning electron microscope and/or a transmission electron microscope. Typically, the polymer is produced in the form of a sheet structure with a diameter of tens of nanometers to several centimeters and a thickness of about 0.3 nanometers to several m.

(Substituent W)

The substituent W is a monovalent group containing no pyridyl group. Specific examples thereof include halogen atoms, alkyl groups (for example, methyl, ethyl, propyl, isopropyl, tert-butyl, pentyl, hexyl, octyl, dodecyl, tridecyl, tetradecyl, pentadecyl, and the like), cycloalkyl groups (for example, cyclopentyl, cyclohexyl, and the like), alkenyl groups (for example, vinyl, allyl, and the like), alkynyl groups (for example, ethynyl, propargyl, and the like), alkoxy groups (for example, methoxy, ethoxy, propyloxy, pentyloxy, hexyloxy, octyloxy, dodecyloxy, and the like), cycloalkoxy groups (for example, cyclopentyloxy, cyclohexyloxy, and the like), aryloxy groups (for example, phenoxy, naphthyloxy, and the like), alkylthio groups (for example, methylthio, ethylthio, propylthio, pentylthio, hexylthio, octylthio, dodecylthio, and the like), cycloalkylthio groups (for example, cyclopentylthio, cyclohexylthio, and the like), arylthio groups (for example, phenylthio, naphthylthio, and the like), alkoxycarbonyl groups (for example, methyloxycarbonyl, ethyloxycarbonyl, butyloxycarbonyl, octyloxycarbonyl, dodecyloxycarbonyl, and the like), aryloxycarbonyl groups (for example, phenyloxycarbonyl, naphthyloxycarbonyl, and the like), sulfamoyl groups (for example, aminosulfonyl, methylaminosulfonyl, dimethylaminosulfonyl, butylaminosulfonyl, hexylaminosulfonyl, cyclohexylaminosulfonyl, octylaminosulfonyl, dodecylaminosulfonyl, phenylaminosulfonyl, naphthylaminosulfonyl, and the like), etc.

Further, the substituent W may be an acyl group (for example, acetyl, ethylcarbonyl, propylcarbonyl, pentylcarbonyl, cyclohexylcarbonyl, octylcarbonyl, 2-ethylhexylcarbonyl, dodecylcarbonyl, acryloyl, methacryloyl, phenylcarbonyl, naphthylcarbonyl, or the like), an acyloxy group (for example, acetyloxy, ethylcarbonyloxy, butylcarbonyloxy, octylcarbonyloxy, dodecylcarbonyloxy, phenylcarbonyloxy, or the like), an amide group (for example, methylcarbonylamino, ethylcarbonylamino, dimethylcarbonylamino, propylcarbonylamino, pentylcarbonylamino, cyclohexylcarbonylamino, 2-ethylhexylcarbonylamino, octylcarbonylamino, dodecylcarbonylamino, phenylcarbonylamino, naphthylcarbonylamino, or the like), a carbamoyl group (for example, aminocarbonyl, methylaminocarbonyl, dimethylaminocarbonyl, propylaminocarbonyl, pentylaminocarbonyl, cyclohexylaminocarbonyl, octylaminocarbonyl, 2-ethylhexylaminocarbonyl, dodecylaminocarbonyl, phenylaminocarbonyl, naphthylaminocarbonyl, or the like), a ureido group (for example, methyl ureido, ethyl ureido, pentyl ureido, cyclohexyl ureido, octyl ureido, dodecyl ureido, phenyl ureido, naphthyl ureido, or the like), a sulfinyl group (for example, methylsulfinyl, ethylsulfinyl, butylsulfinyl, cyclohexylsulfinyl, 2-ethylhexylsulfinyl, dodecylsulfinyl, phenylsulfinyl, naphthylsulfinyl, or the like), an alkylsulfonyl group (for example, methylsulfonyl, ethylsulfonyl, butylsulfonyl, cyclohexylsulfonyl, 2-ethylhexylsulfonyl, dodecylsulfonyl, or the like), an arylsulfonyl group or a heteroarylsulfonyl group (for example, phenylsulfonyl, naphthylsulfonyl, or the like), an amino group (includes an amino group, an alkylamino group, an alkenylamino group, an arylamino group, a heterocyclic amino group, for example, amino, ethylamino, dimethylamino, butylamino, cyclopentylamino, 2-ethylhexylamino, dodecylamino, anilino, naphthylamino, or the like), a cyano group, a nitro group, a hydroxy group, a mercapto group, a silyl group (for example, trimethylsilyl, triisopropylsilyl, triphenylsilyl, phenyldiethylsilyl, or the like), etc.

Each of these groups may further have a substituent, and examples of this substituent include the substituents described above. Example thereof include an aralkyl group in which an aryl group is substituted with an alkyl group, a hydroxyalkyl group in which a hydroxy group is substituted with an alkyl group, and the like. When the substituent W further has a plurality of substituents, the plurality of substituents may be bonded to each other to form a ring.

Particularly, the substituent W is preferably a hydrocarbon group having 1 to 10 carbon atoms which may have a heteroatom, more preferably an alkyl group having 1 to 10 carbon atoms, and still more preferably an alkyl group having 1 to 6 carbon atoms, from a point of view that a polymer having a more excellent effect of the present invention can be obtained.

[Method for Producing Polymer]

The method for producing the polymer according to the present invention is not particularly limited, and a known method can be applied. Particularly, a method for producing a polymer comprising the following steps is preferable from a point of view that a polymer can be obtained more easily and more quickly.

That is, a preferred method for producing a polymer includes the following steps: synthesizing the compound A (step 1); preparing a solution containing the compound A and an organic solvent, and an aqueous solution containing a compound serving as an ion source of a specific metal ion, and bringing the solution and the aqueous solution into contact with each other to form a water/oil interface (step 2); and polymerizing the compound A at the water/oil interface through the specific metal ion (step 3).

(Step 1)

The step 1 is a step of synthesizing the compound A. The method for synthesizing the compound A is not particularly limited, and a known method can be applied. As the method for synthesizing the compound A, for example, the Wittig reaction or the like can be used. More specifically, the methods described in Inorg. Chem. 1995, 34, 473-487 are applicable and the methods are incorporated herein.

(Step 2)

The step 2 is a step of preparing a solution containing the compound A and an organic solvent (a compound A solution), and an aqueous solution containing a compound serving as an ion source of a specific metal ion source (a metal ion aqueous solution), and bringing the solution and the aqueous solution into contact with each other to form a water/oil interface.

Compound A Solution

The organic solvent contained in the compound A solution is not particularly limited as long as it is an organic solvent that can dissolve the compound A and is unlikely to be miscible (preferably immiscible) with water. Examples of the organic solvent include alkyl halides such as dichloromethane.

The content of the compound A in the compound A solution is not particularly limited. Generally, the content is preferably 0.05 mM (mmol/l) to 1.0 M (mol/l) with respect to the total mass of the compound A solution.

The compound A solution may contain two or more kinds of the compound A. When the compound A solution contains two or more kinds of the compound A, the total content thereof is preferably within the above range.

Metal Ion Aqueous Solution

The metal ion aqueous solution is an aqueous solution containing a specific metal ion, and is typically an aqueous solution in which a compound serving as an ion source is dissolved. Note that the specific metal ion has already been described.

The compound serving as an ion source is preferably a metal salt composed of a specific metal ion and its counter anion. At this time, the counter anion is preferably at least one selected from the group consisting of acetate ion, phosphate ion, chlorine ion, phosphorus hexafluoride ion, boron tetrafluoride ion (borofluoride ion), and polyoxometalate, from the viewpoint that the polymer has more excellent stability.

The content of the compound (typically a metal salt) as an ion source in the metal ion aqueous solution is not particularly limited. Generally, the content is preferably 1 mM to 500 mM, and is more preferably 10 mM to 300 mM with respect to the total mass of the metal ion aqueous solution.

The method for bringing the compound A solution into contact with the metal ion aqueous solution to form a water/oil interface is not particularly limited, and examples thereof include a method in which the compound A solution is held in a container at room temperature under atmospheric pressure, and the metal ion aqueous solution is slowly added to the container.

(Step 3)

The step 3 is a step of polymerizing the compound A at the water/oil interface through a metal ion. The polymerization method is not particularly limited, and examples thereof include a method in which the reaction is carried out at 10 to 30° C. under atmospheric pressure for 2 to 24 hours.

Usually, the polymer according to one embodiment of the present invention is rapidly coordinated to the metal ion due to the structure of the compound A. As a result, this polymer has a significant advantage that the reaction proceeds in a short time (for example, within 24 hours) under milder conditions (for example, at room temperature and under atmospheric pressure).

It is noted that reference can be made to J. Am. Chem. Soc. 2015, 137, 4681-4689 for the production method at the water/oil interface, and the disclosure of this document is incorporated herein.

[Composition]

The composition according to one embodiment of the present invention contains a polymer and a counterion (typically a counter anion). The form of the composition is not particularly limited as long as it contains a polymer and a counterion, and examples thereof include a sheet and a liquid material containing a solvent described later. In the counterion-containing composition, the charge of the polymer is more likely to be maintained neutral, resulting in higher stability of the polymer.

The counterion is not particularly limited, and at least one counterion selected from the group consisting of acetate ion, phosphate ion, chlorine ion, phosphorus hexafluoride ion, boron tetrafluoride ion, and polyoxomethalate is preferable.

The counterion may be a counterion which is intentionally added to the composition, or may be a counterion which is contained in the composition unintentionally or derived from the synthetic raw material of the polymer in the process of synthesizing the polymer (typically a counter anion of a metal salt that is an ion source of a specific metal ion).

The content of the counterion in the composition is not particularly limited. Typically, when the counterion is supplied from a metal salt (an ion source of a specific metal ion), the content of the metal salt in the composition is not particularly limited and may be appropriately controlled.

Further, the composition contains a polymer. The form of the polymer is as described above. The content of the polymer in the composition is not particularly limited, and is usually 0.001 to 99.9% by mass.

Further, the composition may contain a solvent, and examples of the solvent include water and/or an organic solvent. When the composition contains a solvent, this makes it easier to produce an electrochromic element described later.

The above composition contains a polymer having electrochromic properties and a counterion (typically a counter anion) that enhances stability by making the polymer electrically neutral, so that the composition can be preferably used for the electrochromic element described later.

[Electrochromic Element]

The electrochromic element according to the present invention is an electrochromic element having at least a pair of electrodes arranged to face each other and a composition layer formed from the above composition arranged between the electrodes.

FIG. 1 shows a conceptual view of an electrochromic element according to one embodiment of the present invention as a non-limiting example.

An electrochromic element 100 includes a pair of transparent electrodes (a first transparent electrode 101 and a second transparent electrode 104) arranged to face each other, a composition layer 102 arranged on the first transparent electrode 101, and the second transparent electrode 104 arranged above the composition layer 102.

It is noted that, in the electrochromic element 100, both of the electrodes arranged to face each other are transparent electrodes and can transmit external light, so the electrochromic element is preferably used as a light control device. When the electrochromic element is used as a display element, at least one of the electrodes may be a transparent electrode. In the display element, it is preferable that the transparent electrode side is a visual recognition side.

The electrochromic element 100 has a polymer solid electrolyte 103 between the second transparent electrode 104 and the composition layer 102 formed from the composition described above. The electrochromic element according to the present invention is not limited to the above, and does not necessarily have a polymer solid electrolyte.

The first transparent electrode 101 and the second transparent electrode 104 are not particularly limited as long as they are transparent conductive films. Generally, a $SnO_2$ film, an $In_2O_3$ film, or an ITO (Indium Tin Oxide) film which is a mixture of $In_2O_3$ and $SnO_2$ is preferable. The first transparent electrode 101 and the second transparent electrode 104 can be formed on a transparent substrate such as a glass substrate by any physical or chemical vapor deposition method.

The composition layer 102 is a layer formed from a composition containing the polymer and the counterion (typically a counter anion) which are described above. The method for forming the composition layer 102 is not particularly limited. Typically, examples thereof include a method in which the composition layer 102 is formed by coating the first transparent electrode 101 with the composition containing a solvent. Examples of the coating method include spin coating, dip coating, and the like.

Further, in another embodiment, the composition layer 102 can be obtained by directly applying a sheet of the composition containing the polymer and the counterion formed in the step 3 onto the transparent electrode 101.

The thickness of the composition layer 102 may vary depending on the color depth of the composition used, and the like. In one embodiment, the thickness of the composition layer 102 may be approximately 0.02 micrometers or more and 200 micrometers or less, and more preferably 0.1 micrometer or more and 10 micrometers or less.

The polymer solid electrolyte 103 is formed by dissolving an electrolyte in a polymer for a matrix. This electrolyte may be used in combination with a colorant to improve contrast. It is noted that the colorant is not necessary when it is not necessary to improve the contrast.

When a polymer electrolyte is used, the thickness of the polymer electrolyte layer 103 is not particularly limited. It is desirable that the thickness of the polymer electrolyte layer 103 is about 10 micrometers or more so that the composition layer 102 and the second transparent electrode 104 are prevented from physically contacting each other due to vibration or the like.

Next, the operation of the electrochromic element 100 will be described.

The first transparent electrode 101 and the second transparent electrode 104 are connected to a power source (not shown), and a predetermined voltage is applied to the composition layer 102 and the polymer solid electrolyte 103. Thus, the oxidation and reduction of the polymer in the composition layer 102 can be controlled.

More specifically, when a predetermined voltage is applied, the oxidation-reduction reaction of the metal ion of the polymer in the composition layer 102 can be controlled. As a result, the color development and decolorization of the electrochromic element can be controlled.

The electrochromic element can be applied to a light control device, a display device, and the like.

EXAMPLES

The present invention will be described in more detail based on the following examples. The materials, amounts, ratios, processes, processing procedures, and the like shown in the following examples can be appropriately changed without departing from the spirit of the present invention. Therefore, the scope of the present invention should not be limitedly interpreted by the following examples.

All chemicals used in the following examples were purchased from Aldrich Chemical Co., Tokyo Chemical Industry Co., Ltd. (TCI), Wako Pure Chemical Industries, Ltd., and Kanto Chemical Co., Inc.

Indium tin oxide (ITO) coated glass substrate (resistivity: 8 to 12 Ω/sq) and anhydrous lithium perchlorate ($LiClO_4$) were purchased from Aldrich Chemical Co.

Anhydrous grade solvents were used for synthesis, and spectrophotometric grade solvents were used for film preparation, spectroscopic evaluation, element production, scanning electron microscope (SEM), transmission electron microscope (TEM), and atomic force microscope (AFM) measurements.

Silica gel 60N (neutral, 40 to 100 mM) purchased from Kanto Chemical Co., Inc. was used to perform column chromatography separation. For experiments that required water, purified water from the Milli-Q purification system was used.

Nuclear Magnetic Resonance (NMR) spectra were recorded on a JEOL AL300/BZ instrument at 300 MHz. Chemical shifts are given in relation to tetramethylsilane (TMS).

The MALDI mass spectra (MALDI-TOF) were measured with a time-of-flight (TOF) mass spectrometer (AXIMA-CFR, Shimadzu/Kratos) using 1,8,9-trihydroxyanthracene as a matrix. Compounds 3, 4, 5, and BP-1 were prepared according to the following procedures, respectively.

(Synthesis of Compound 3)

Compound 3 was synthesized from Compound 1 based on the scheme below.

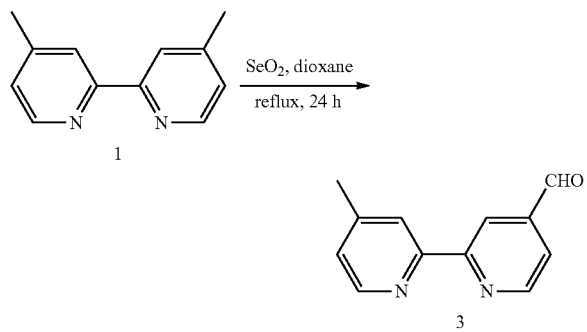

Dioxane (50 mL) was added to Compound 1 (1.8 g, 9.7 mmol) in a 100 mL round-bottom flask and the solution was purged with nitrogen for 15 minutes. Selenium dioxide (1.1 g, 9.9 mmol) was then added to the flask, and nitrogen purging was continued for an additional 20 minutes. Then, the solution was heated to reflux for 24 hours, and the solid selenium metal was allowed to precipitate on the side of the flask as the reaction progressed. After that, the solution was cooled to room temperature and then gravity-filtered. The solvent was removed under reduced pressure to obtain a solid product. This solid product was dissolved in ethyl acetate, heated to reflux for 1 hour, and gravity-filtered while it was hot. Thereafter, the filtrate was washed with 0.1 M sodium carbonate (2×30 mL), and the formed bipyridine acid was extracted and extracted in a 0.3 M solution of sodium metabisulfite. Sodium bicarbonate was added to adjust the pH of the extract to 10, and the product was extracted in dichloromethane (DCM). The solvent was evaporated under reduced pressure to obtain Compound 3 (0.82 g, 43% yield).

$^1$H-NMR (300 MHz, $CDCl_3$) δ (ppm) 10.19 (s, 1H), 8.91 (d, 1H), 8.84 (s, 1H), 8.59 (d, 1H), 8.28 (s, 1H), 7.74 (d, 1H), 7.21 (d, 1H), 2.47 (s, 3H).

MALDI-TOF (m/z): $[M+H]^+$ calculated value: 198.23, measured value: 198.87.

(Synthesis of Compound 4)

Compound 4 was synthesized from Compound 2 based on the scheme below.

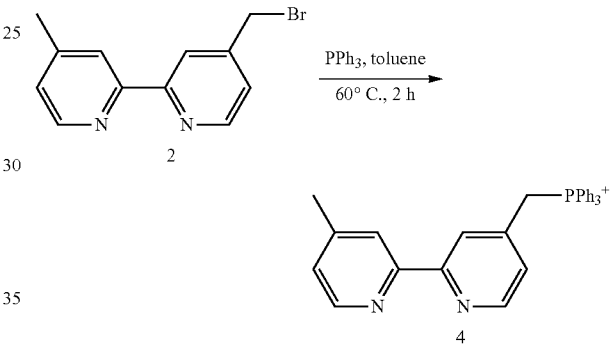

Compound 2 (0.1 g, 0.38 mmol) and excess $PPh_3$ (triphenylphosphine, 1 g, 3.8 mmol) were added to toluene (5 mL), and the resultant solution was heated at 60° C. for 2 hours.

Then, the mixture was cooled to room temperature and filtered. After that, the residue was washed with toluene and dried under vacuum overnight, thereby obtaining Compound 4 (0.152 g, 90% yield) that could be used without further purification.

$^1$H-NMR (300 MHz, DMSO-d6) δ (ppm) 8.54 (d, 1H), 8.41 (d, 1H), 8.17 (s, 1H), 8.10 (s, 1H), 7.89-7.73 (m, 12H), 7.25 (m, 1H), 7.16 (m, 1H), 5.39-5.33 (d, 2H), 2.51 (s, 3H).

MALDI-TOF (m/z): $[M+H]^+$ calculated value: 445.53, measured value: 445.60.

(Synthesis of Compound 5)

Compound 5 was synthesized from Compound 2 based on the scheme below.

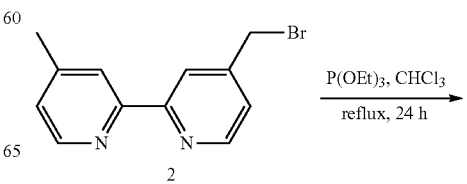

-continued

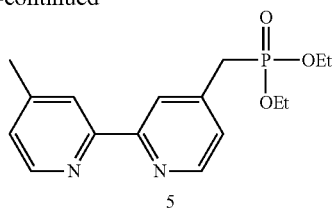
5

Compound 2 (3 g, 11.4 mmol) and triethyl phosphite (20 ml) were dissolved in 100 mL of CHCl$_3$ and refluxed at 80° C. for 24 hours in a nitrogen atmosphere.

The solution was then cooled to room temperature, followed by removal of the solvent and excess triethyl phosphite under reduced pressure. Thus, an oily brown residue was obtained, and this residue was purified by column chromatography (silica gel, acetone as an eluent). Finally, a clear oily liquid was obtained (3.1 g, 85% yield).

$^1$H-NMR (300 MHz, CDCl$_3$) δ (ppm) 8.62 (1H, d), 8.54 (1H, d), 8.32 (1H, s), 8.23 (1H, s), 7.32 (1H, d), 7.13 (1H, d), 4.10 (4H, m), 3.28 (2H, d), 2.44 (3H, s), 1.27-1.39 (6H, m).

MALDI-TOF (m/z): [M+H]$^+$ calculated value: 320.33, measured value: 320.97.

(Synthesis of BP-1)

BP-1 was synthesized from Compound 3 and Compound 4 based on the scheme below.

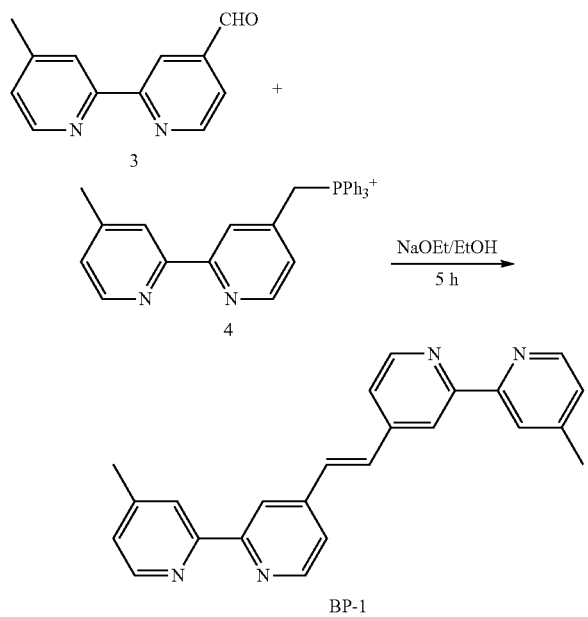

Compound 3 (0.220 g, 1.12 mmol) and Compound 4 (0.670 g, 1.28 mmol) were dissolved in ethanol (EtOH; 30 mL) and stirred at 0° C. under nitrogen for 20 minutes. A solution of 0.3 M NaOEt/EtOH (4 mL) was then added dropwise over 5 minutes to warm the solution to room temperature. Then, after 5 hours, the volume was reduced to 15 mL by evaporation under reduced pressure and H$_2$O (10 mL) was added.

The mixture was filtered to isolate the product as a white powder, and this powder was washed with 1:1 H$_2$O/EtOH, dried under vacuum, and finally recrystallized from methanol (MeOH). 0.175 g (yield 43%) of BP-1 was obtained.

$^1$H-NMR (300 MHz, CDCl$_3$) δ (ppm) 8.70 (2H, d), 8.60-8.58 (4H, m), 8.27 (2H, s), 7.42 (2H, s), 7.40-7.17 (2H, d), 2.43 (6H, s).

MALDI-TOF (m/z): [M+H]$^+$ calculated value: 364.45, measured value: 364.82.

IR: 1590 cm$^{-1}$ (C=C). UV: 288 nm (1×10$^{-5}$ M, DCM).

(Synthesis of BP-2)

BP-2 was synthesized from Compound 5 and Compound 6 based on the scheme below.

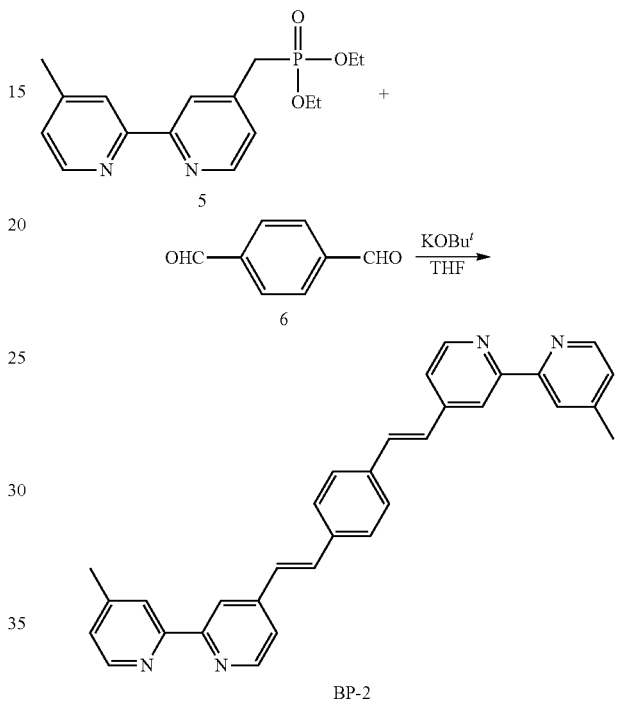

In a nitrogen atmosphere, solid potassium tert-butoxide (0.45 g, 4 mmol) was added at once to 50 mL of a tetrahydrofuran (THF) solution of Compound 5 (0.704 mg, 2.2 mmol) and Compound 6: terephthalaldehyde (0.134 g, 1 mmol).

Then, the reaction mixture was stirred at room temperature for 10 hours. After that, the reaction mixture was quenched with water (25 mL), THF was removed under reduced pressure, and the aqueous residue was extracted with DCM.

The collected organic layer was washed with water (50 mL), dried over magnesium sulfate and filtered. After evaporation of the solvent, the residue was recrystallized in a DCM/hexane (1:2) solvent mixture, and a yellow crystalline solid product (0.30 g, 65% yield) was obtained.

$^1$H-NMR (300 MHz, CDCl$_3$) δ (ppm) 8.67 (2H, d), 8.60-8.54 (4H, m), 8.28 (2H, d), 7.60 (4H, m), 7.50-7.41), 7.20-7.15 (4H, m), 2.47 (6H, sb).

MALDI-TOF (m/z): [M+H]$^+$ calculated value: 466.59, measured value: 466.57.

IR: 1588 cm$^{-1}$ (C=C). UV: 358 nm (1×10$^{-5}$ M, DCM).

(Preparation of Composition 1)

A 0.1 mM solution of BP-1 in CH$_2$Cl$_2$ was prepared by dissolving 1 mg of BP-1 in 10 mL of CH$_2$Cl$_2$, and this solution was filtered before use.

This solution was poured into a vial with a diameter of 40 mm, and pure water (10 mL) was poured into the solution of BP-1 to form a water/oil interface.

An aqueous solution of $Fe(BF_4)_2$ (50 mM, 10 mL, filtered before use) was then added to the aqueous phase by slow pipetting. After 24 hours, Polymer 1 was synthesized as a purple film at the interface.

Then, the aqueous layer was replaced with pure water, followed by removal of both the organic and aqueous phases. Ethanol and $CH_2Cl_2$ were added to the film to obtain a suspension of flakes containing the film. The films were then collected by filtration and dried in vacuum to obtain a sheet of Composition 1.

Note that Composition 1 contains "BP-1-$Fe^{2+}$" (Polymer 1), which is a polymer obtained by coordinating BP-1 to $Fe^{2+}$ and polymerizing it, and a counter anion (borofluoride ion).

Figure 2:
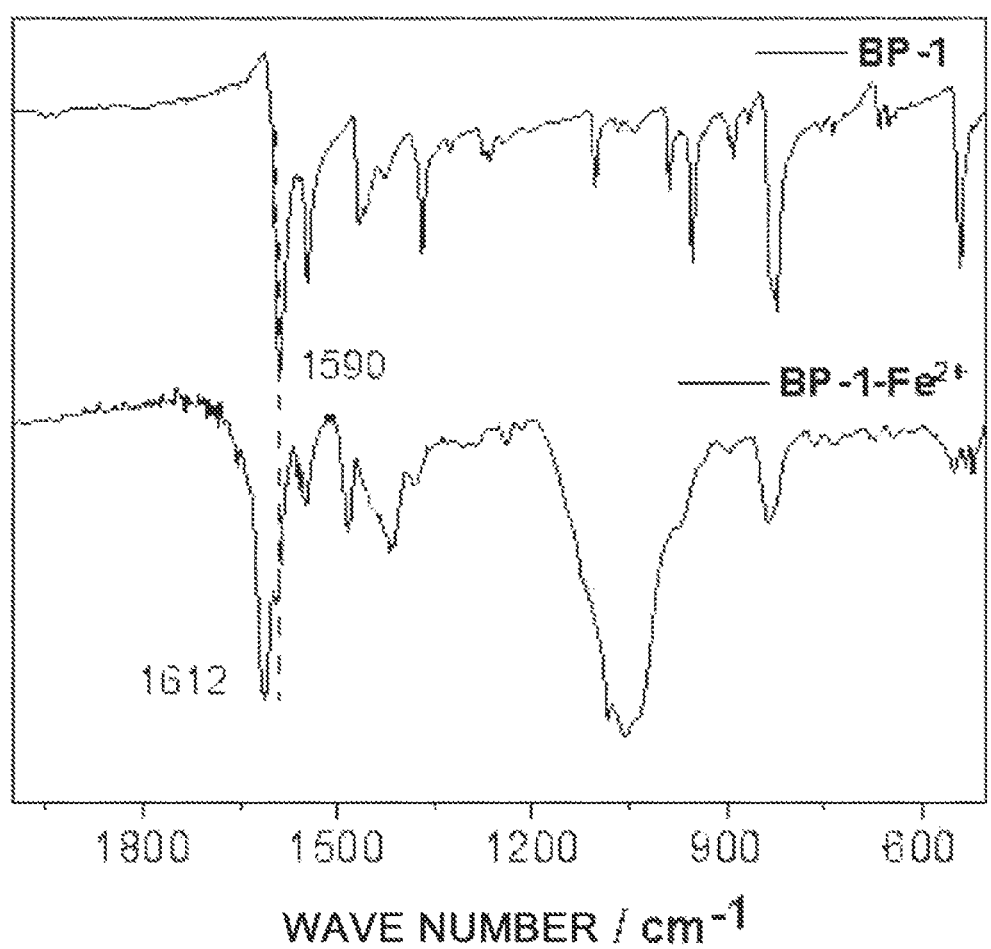
FIG. 2 is an infrared absorption spectrum of a composition 1 containing a polymer 1 and a counterion.

The infrared absorption (IR) spectrum of the above composition was measured. The measurement method will be described later. The results are shown in FIG. 2. In FIG. 2, "BP-1-$Fe^{2+}$" indicates Composition 1 containing Polymer 1.

According to FIG. 2, it can be seen that the peak corresponding to the C=C bond is 1590 $cm^{-1}$ in BP-1 (a compound A), but is shifted to 1612 $cm^{-1}$ in Composition 1.

Note that the absorption of Composition 1 in the vicinity of 1150 $cm^{-1}$ corresponds to the counter anion (borofluoride ion) contained in the above sheet.

Figure 3:
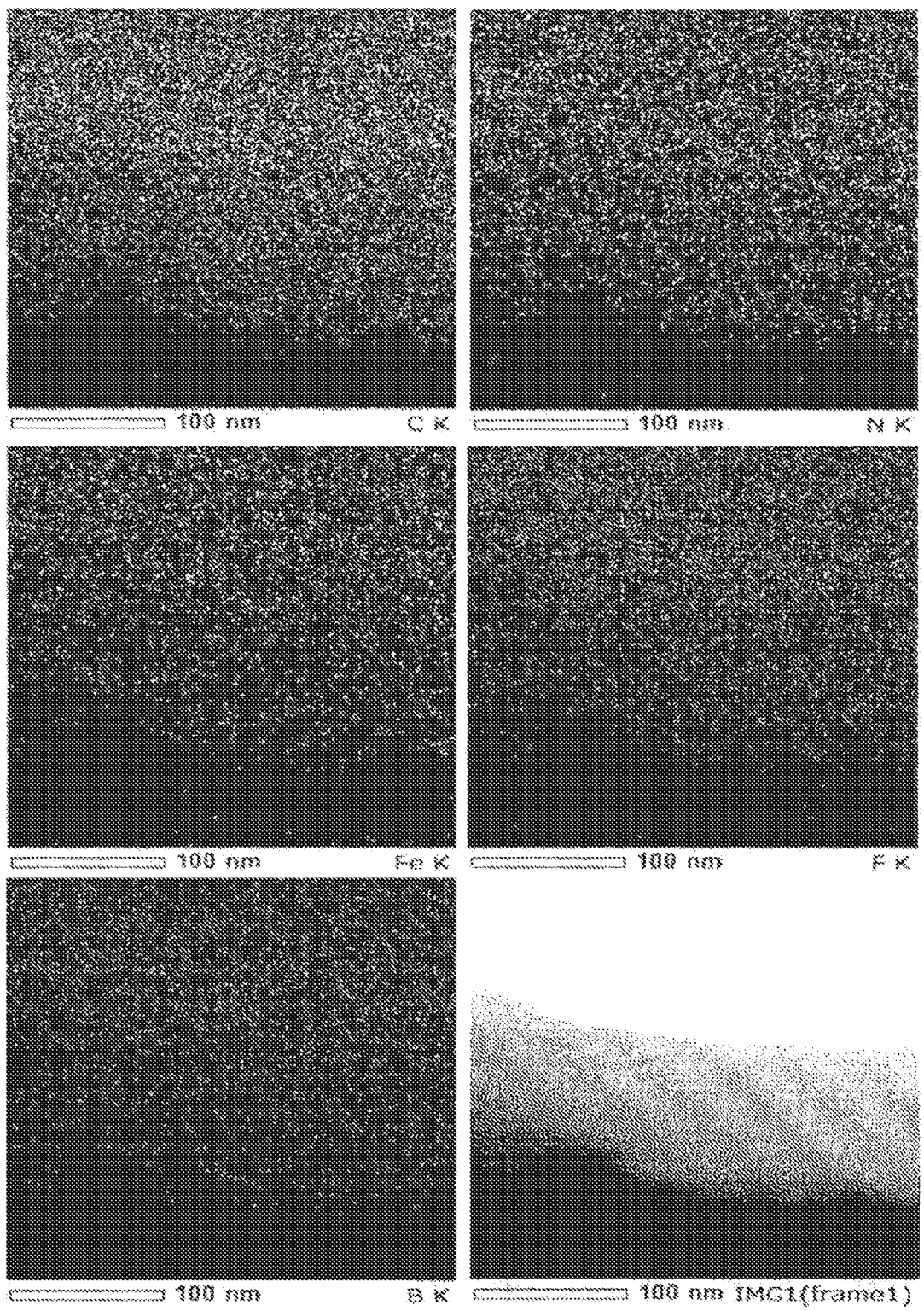
FIG. 3 shows elemental analysis results of a sheet containing the polymer 1 (BP-1-$Fe^{2+}$) by an energy dispersive X-ray analysis method.
Figure 4:
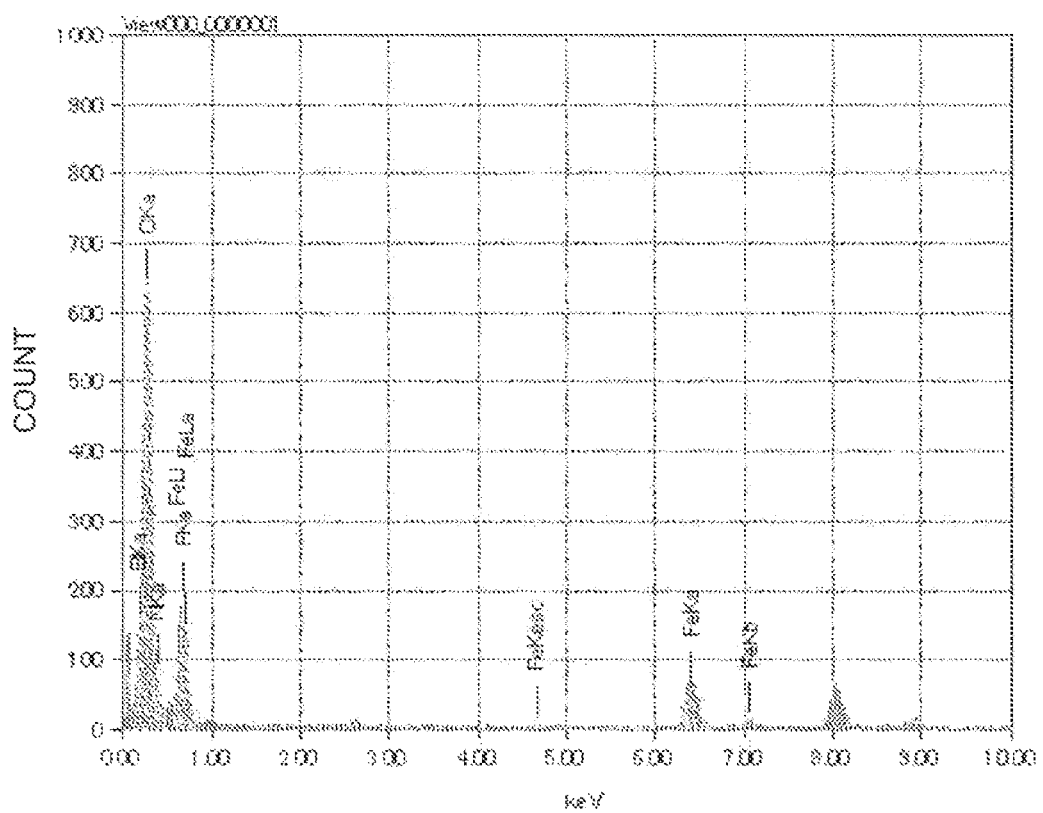
FIG. 4 shows elemental analysis results of a sheet containing the polymer 1 (BP-1-$Fe^{2+}$) by the energy dispersive X-ray analysis method.

Further, FIGS. 3 and 4 show the results of elemental analysis of the sheet containing Polymer 1 by the energy dispersive X-ray analysis method. According to the above, it was confirmed that the sheet contained carbon, iron, boron, nitrogen, and fluorine, and contained "BP-1-$Fe^{2+}$" (Polymer 1) and the counter anion.

(Synthesis of Composition 2)

Composition 2 was prepared in a similar manner to Composition 1 except that a 0.12 mM solution of BP-2 in $CH_2Cl_2$ was used instead of the BP-1 solution. The resulting sheet was magenta.

Figure 5:
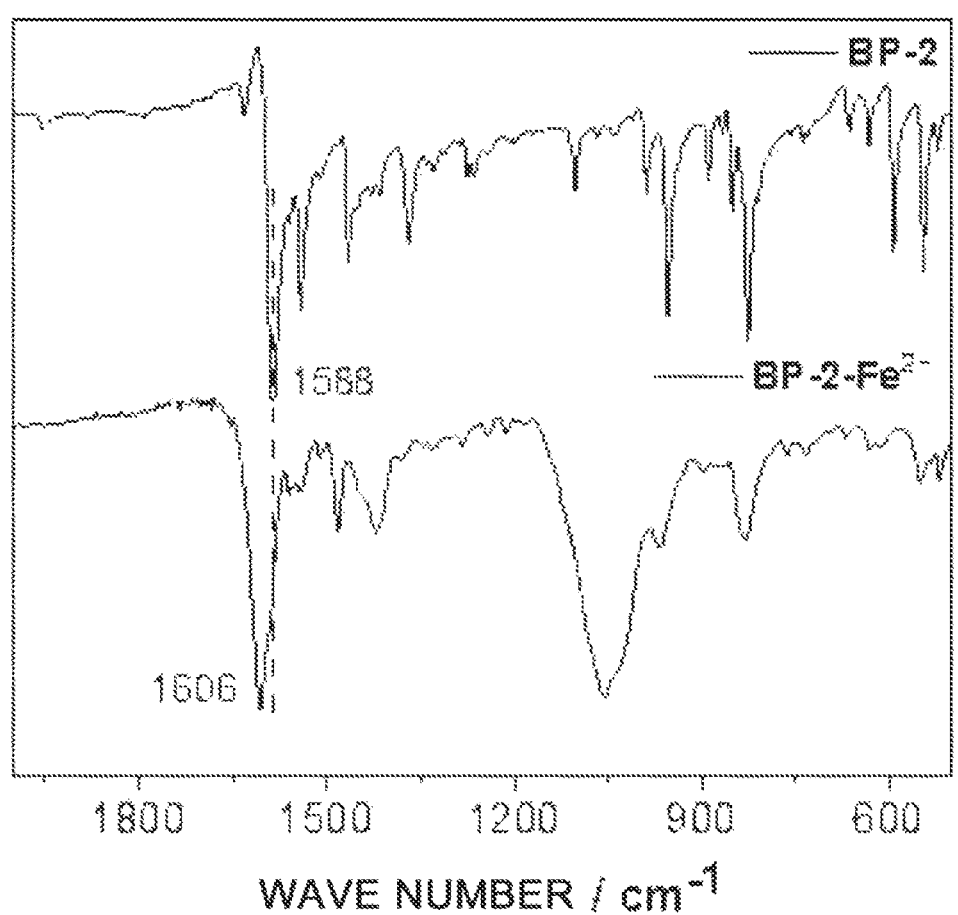
FIG. 5 is an infrared absorption spectrum of a composition 2 containing a polymer 2 and a counterion.
Figure 6:
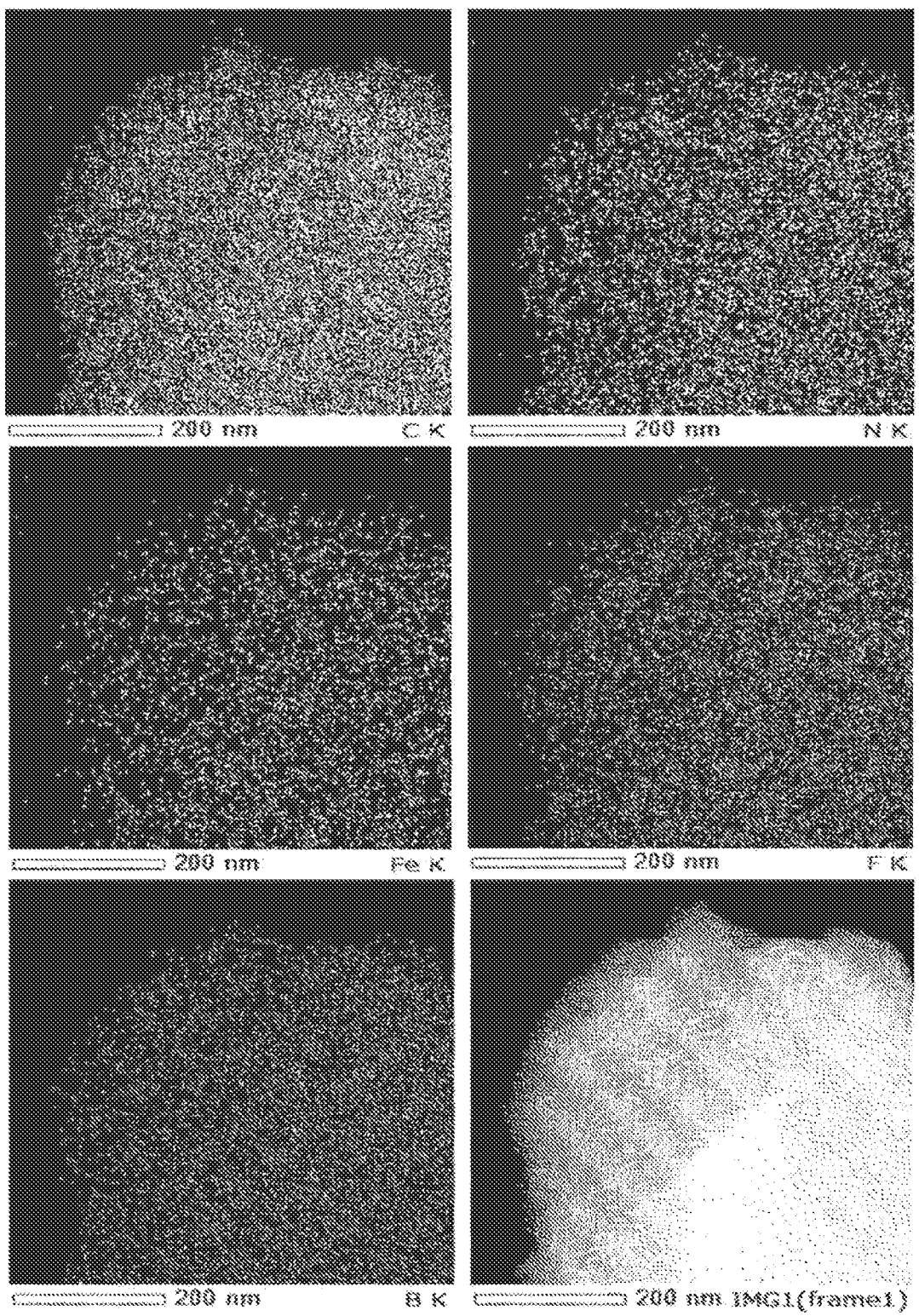
FIG. 6 shows elemental analysis results of a sheet containing the polymer 2 (BP-2-$Fe^{2+}$) by the energy dispersive X-ray analysis method.
Figure 7:
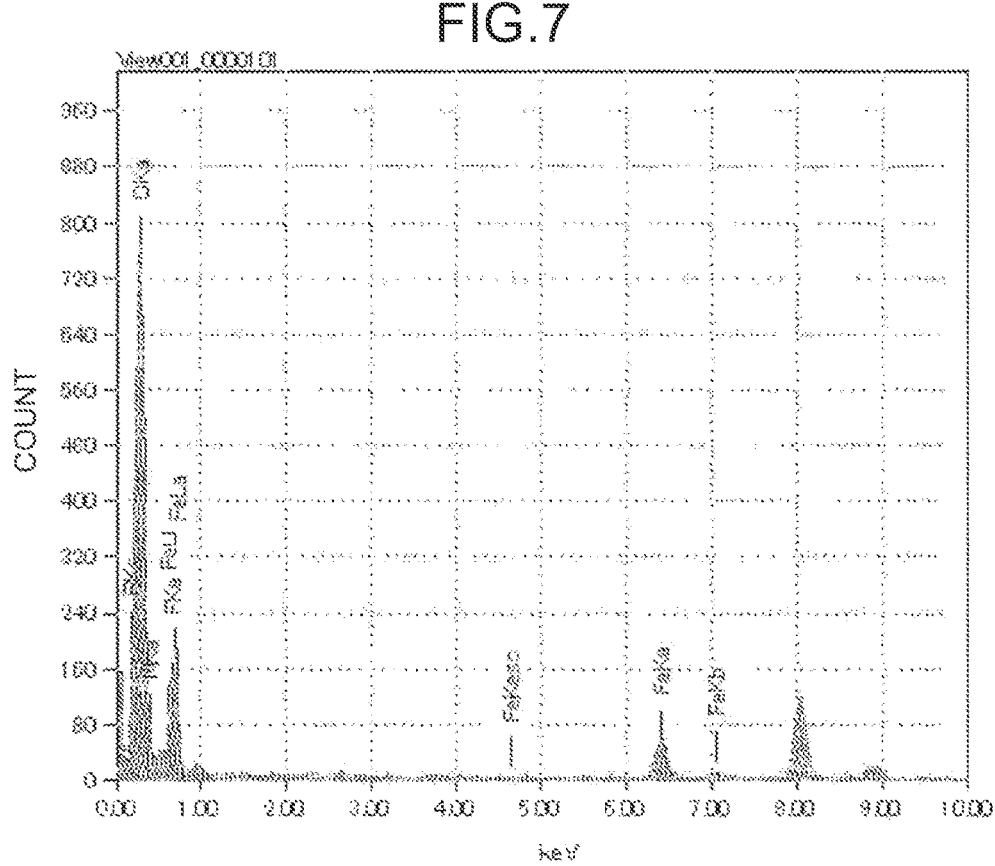
FIG. 7 shows elemental analysis results of a sheet containing the polymer 2 (BP-2-$Fe^{2+}$) by the energy dispersive X-ray analysis method.

Composition 2 contains "BP-2-$Fe^{2+}$" (Polymer 2), which is a polymer obtained by coordinating BP-2 to $Fe^{2+}$ and polymerizing it, and a counter anion (borofluoride ion). Note that, similarly to Composition 1, the infrared absorption spectrum of Composition 2 is shown in FIG. 5, and the elemental analysis results by the energy dispersive X-ray analysis method are shown in FIGS. 6 and 7.

Figure 8:
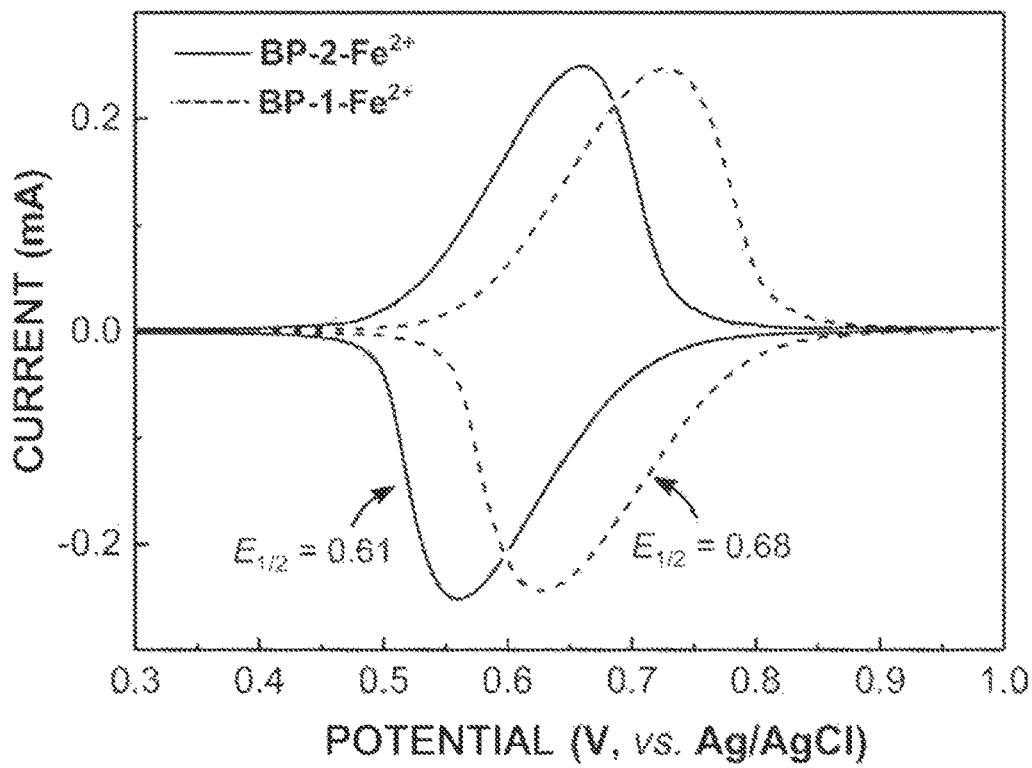
FIG. 8 shows electrochemical responses of the composition 1 and the composition 2 which were obtained by cyclic voltammetry measurement.

First, the electrochemical responses of Composition 1 and Composition 2 were investigated by cyclic voltammetry measurement described later. The results are shown in FIG. 8. In FIG. 8, "BP-1-$Fe^{2+}$" corresponds to Composition 1 containing Polymer 1, and "BP-2-$Fe^{2+}$" corresponds to Composition 2 containing Polymer 2.

In FIG. 8, the peak observed when sweeping from 20.3 V to +1.0 V shows oxidation, and the peak observed when sweeping from +1.0 V to 0.3 V shows reduction. This oxidation is due to the iron ions in the polymer changing from divalent to trivalent, and the reduction is due to the iron ions changing from trivalent to divalent.

Since the peak current values indicating oxidation and reduction were the same, it was found that the oxidation and reduction occurred reversibly. Note that even if such sweeping was repeated 500 times, the result did not change, and each composition containing the polymer did not exhibit fatigue due to voltage application.

Next, the change in color development of each composition was visually observed. Each composition (sheet) placed on a transparent electrode (ITO electrode) was used as a sample, and the change in color development when a voltage was applied was observed. The result of Composition 1 was shown in FIG. 9, and the result of Composition 2 was shown in FIG. 10.

Figure 9:
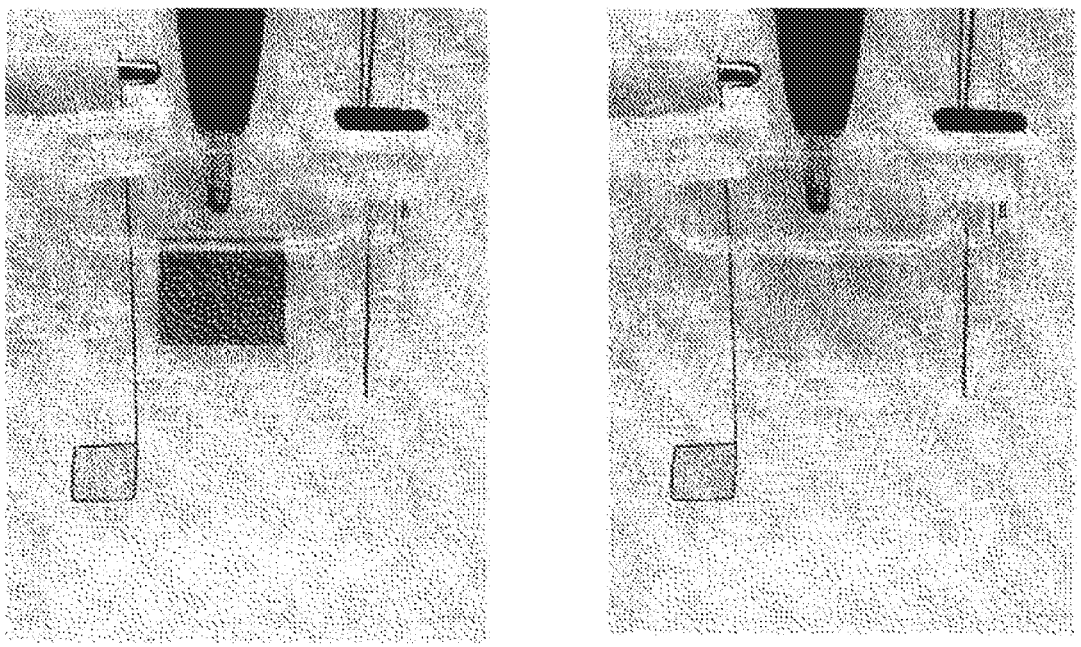
FIG. 9 shows photographs showing a change in color development of the composition 1 (sheet) placed on an ITO electrode.

As shown in FIG. 9, Composition 1 was derived from "BP-1-$Fe^{2+}$" and was purple transparent in the reduced state (FIG. 9, left side). Then, when a voltage was applied, the purple color disappeared and the composition became colorless and transparent (FIG. 9, right side, decolorized state). Composition 1 is derived from "BP-1-$Fe^{2+}$" and is considered to have less scattering of incident light from the outside in the decolorized state. As a result, it was found that the composition looked more transparent and had excellent properties.

Figure 10:
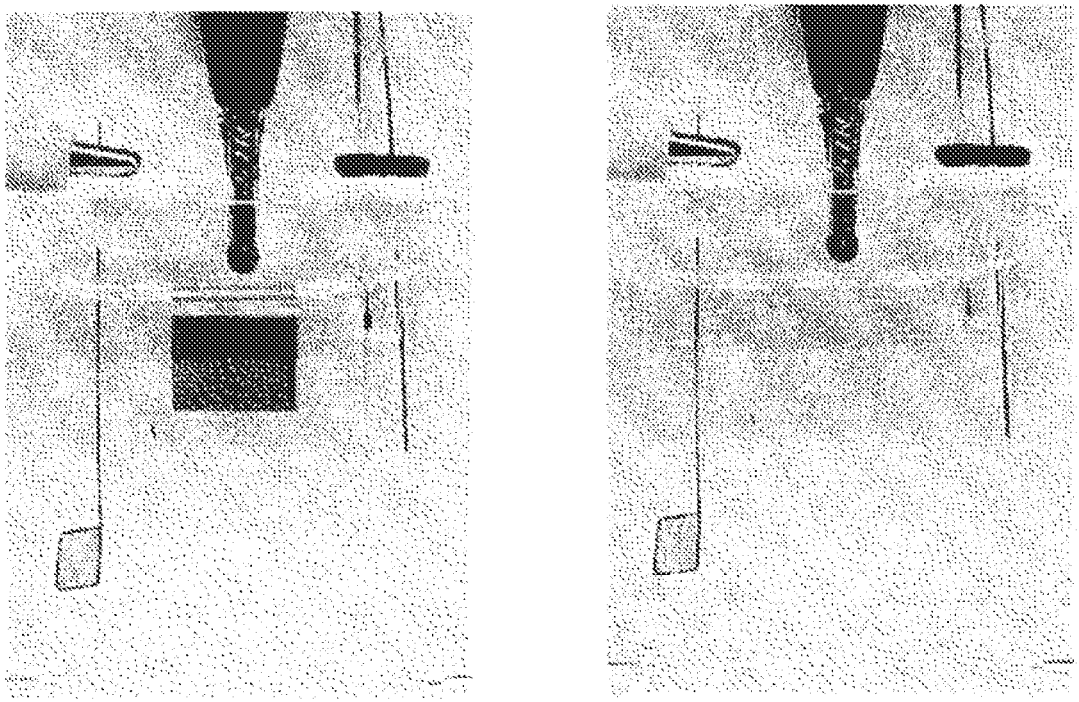
FIG. 10 shows photographs showing a change in color development of the composition 2 (sheet) placed on an ITO electrode.

Further, as shown in FIG. 10, Composition 2 was derived from "BP-2-$Fe^{2+}$" and was magenta transparent in the reduced state (FIG. 10, left side). Then, when a voltage was applied, the magenta color disappeared and the composition became pale yellow transparent (FIG. 10, right side, decolorized state). Composition 2 is derived from "BP-2-$Fe^{2+}$" and is considered to have less scattering of incident light from the outside in the decolorized state. As a result, it was found that the composition looked more transparent and had excellent properties.

Figure 11:
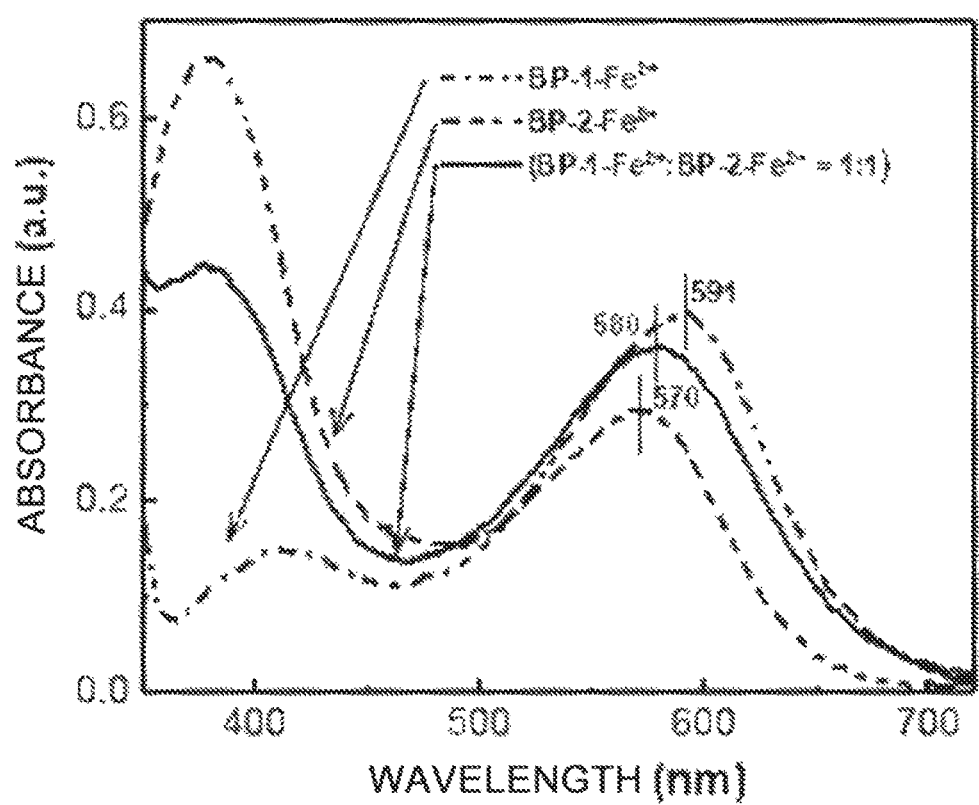
FIG. 11 is an ultraviolet-visible absorption spectrum of the composition 1 and the composition 2.

FIG. 11 is a diagram showing an ultraviolet-visible absorption spectrum of each composition measured by a method described later.

According to FIG. 11, Composition 1 (indicated as "BP-1-$Fe^{2+}$" in FIG. 11) had a peak near 400 nm and a larger peak near 570 nm. This corresponds to the fact that "BP-1-$Fe^{2+}$" is purple (transparent) in the reduced state.

Further, according to FIG. 11, Composition 2 (indicated as "BP-2-$Fe^{2+}$" in FIG. 11) had a large peak near 591 nm. This corresponds to the fact that "BP-2-$Fe^{2+}$" exhibits a magenta color (transparent) in the reduced state.

Furthermore, according to FIG. 11, regarding a 1:1 mixture of "BP-1-$Fe^{2+}$" and "BP-2-$Fe^{2+}$" (in FIG. 11, "BP-1-$Fe^{2+}$:BP-2-$Fe^{2+}$=1:1"), a spectrum reflecting the properties of each of the polymers described above was obtained. From these results, it was found that the color development of the electrochromic element could be controlled by using the polymer according to one embodiment of the present invention.

Figure 12:
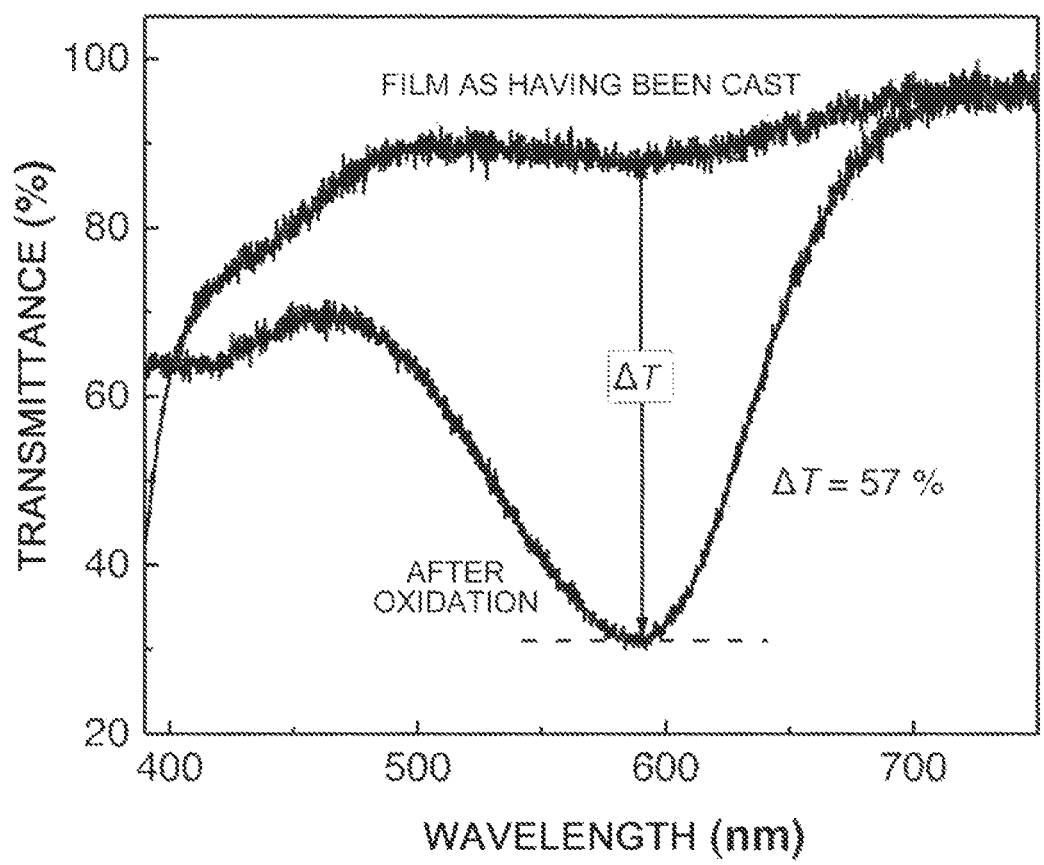
FIG. 12 shows the transmittance of the composition 1 with respect to ultraviolet and visible light.
Figure 13:
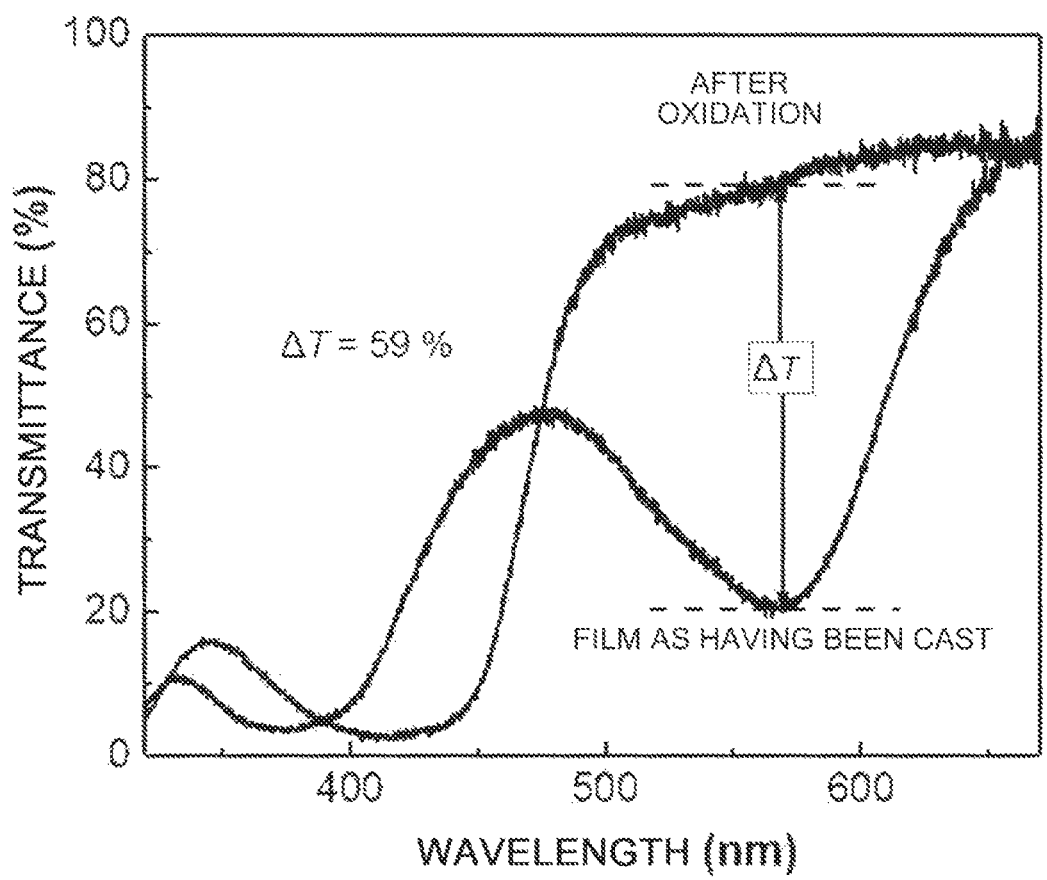
FIG. 13 shows the transmittance of the composition 2 with respect to ultraviolet and visible light.

In addition, FIGS. 12 and 13 show the transmittance with respect to ultraviolet and visible light measured in a similar manner as described above (FIG. 12: Composition 1, FIG. 13: Composition 2). In these figures, it was confirmed that the spectrum of transmitted light was reversibly changed (color development and decolorization occurred) by voltage application. The transmittance ΔT at that time was also calculated.

Figure 14:
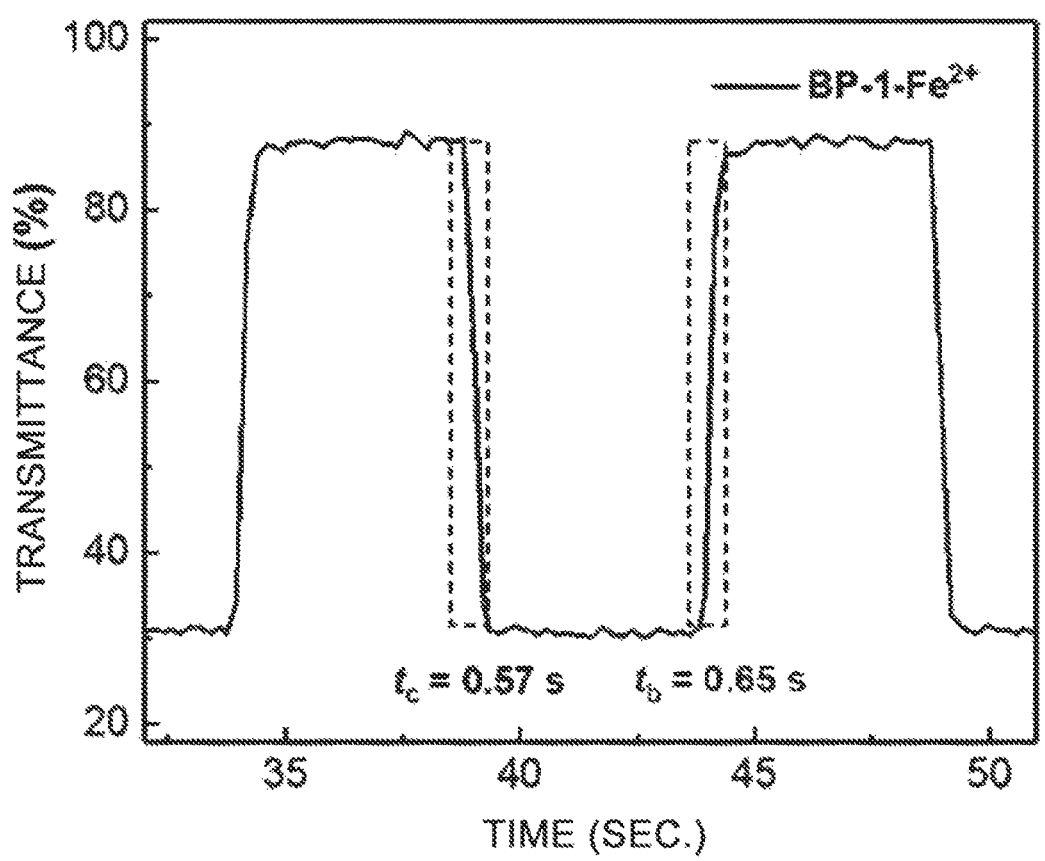
FIG. 14 shows switching characteristics of the peak intensity of the composition 1.
Figure 15:
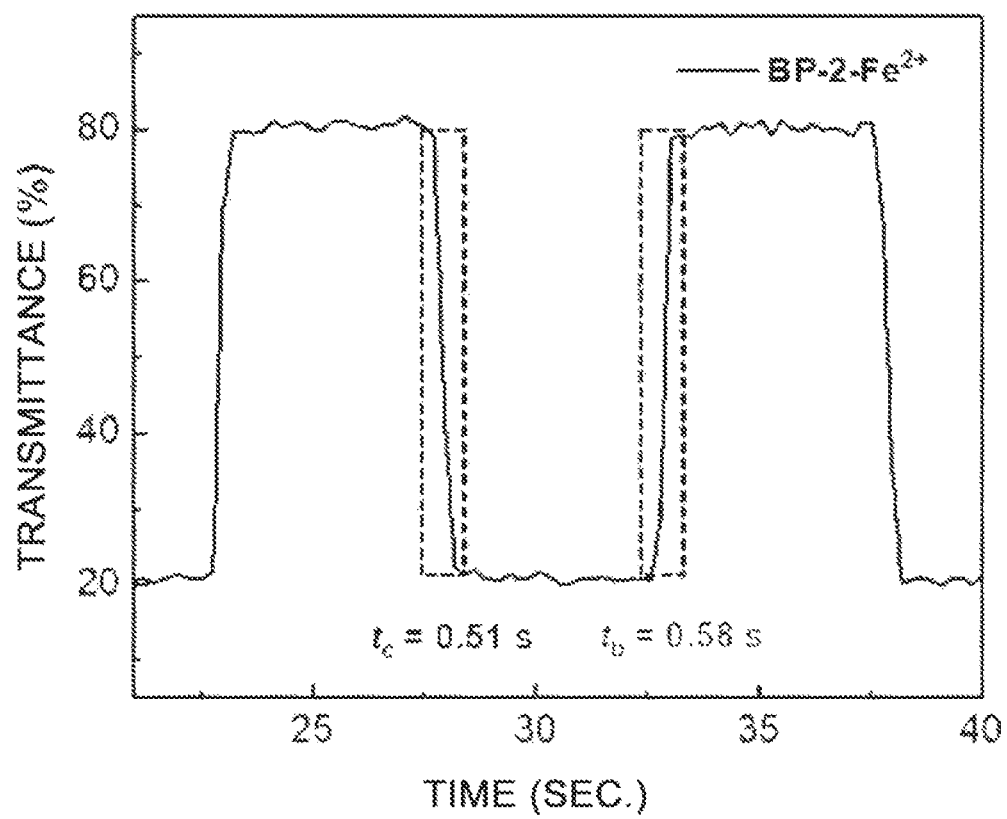
FIG. 15 shows switching properties of the peak intensity of the composition 2.

Switching properties of each peak intensity were shown in FIGS. 14 and 15. FIG. 14 shows the change in transmitted light intensity of Composition 1 at a wavelength of 588.4 nm when the applied voltage was switched from 1.0 V (vs. $Ag/Ag^+$) to 0.4 V (vs. $Ag/Ag^+$).

Further, FIG. 15 shows the change in transmitted light intensity at a wavelength of 568.2 nm when the applied voltage of Composition 2 was switched from 1.0 V (vs. $Ag/Ag^+$) to 0.4 V (vs. $Ag/Ag^+$). According to the above, it was found that the state change from the color-developed state to the decolorized state was rapidly carried out in each polymer.

Figure 16:
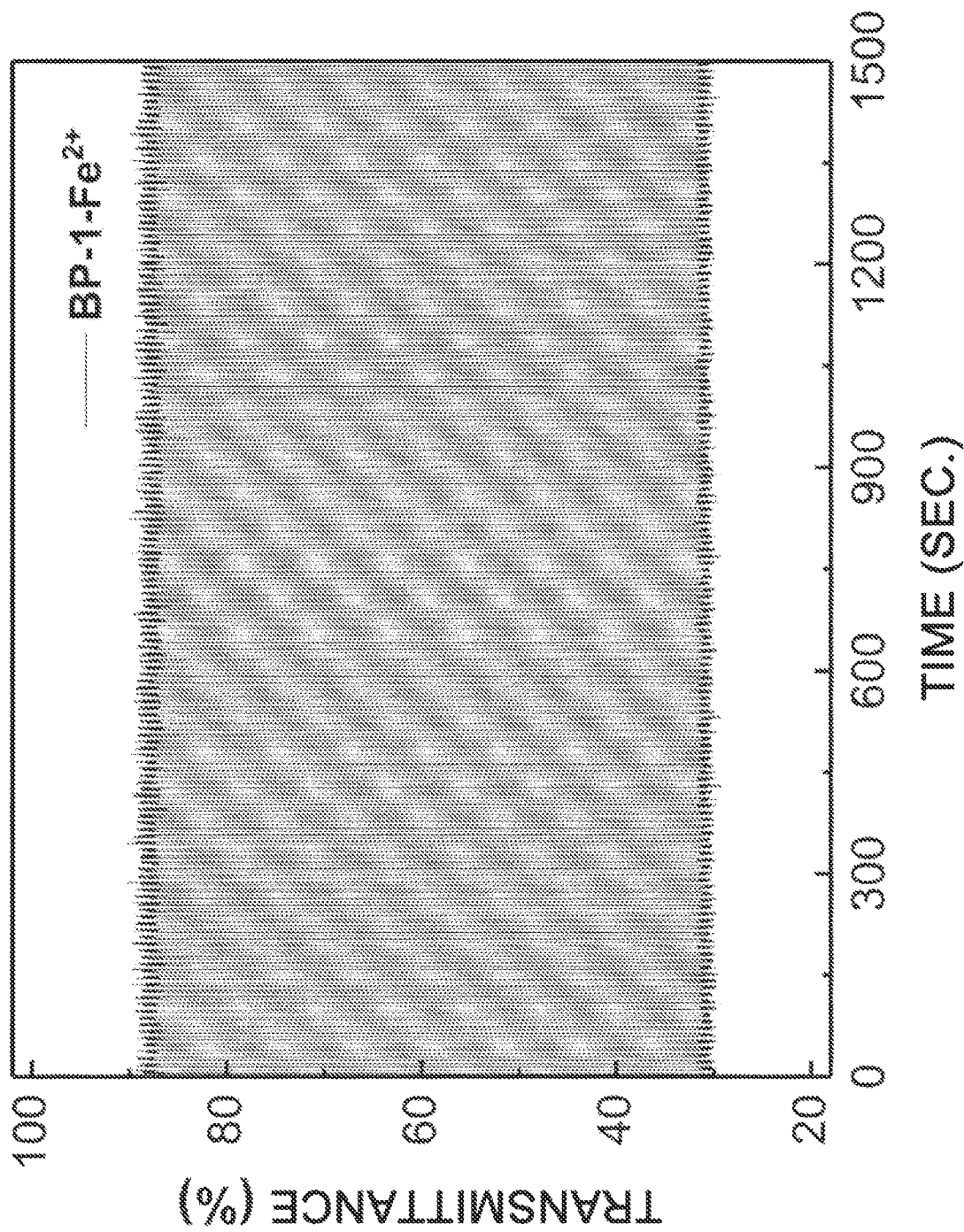
FIG. 16 shows the transmitted light intensity of the composition 1 when peak intensity switching was repeated 300 times.
Figure 17:
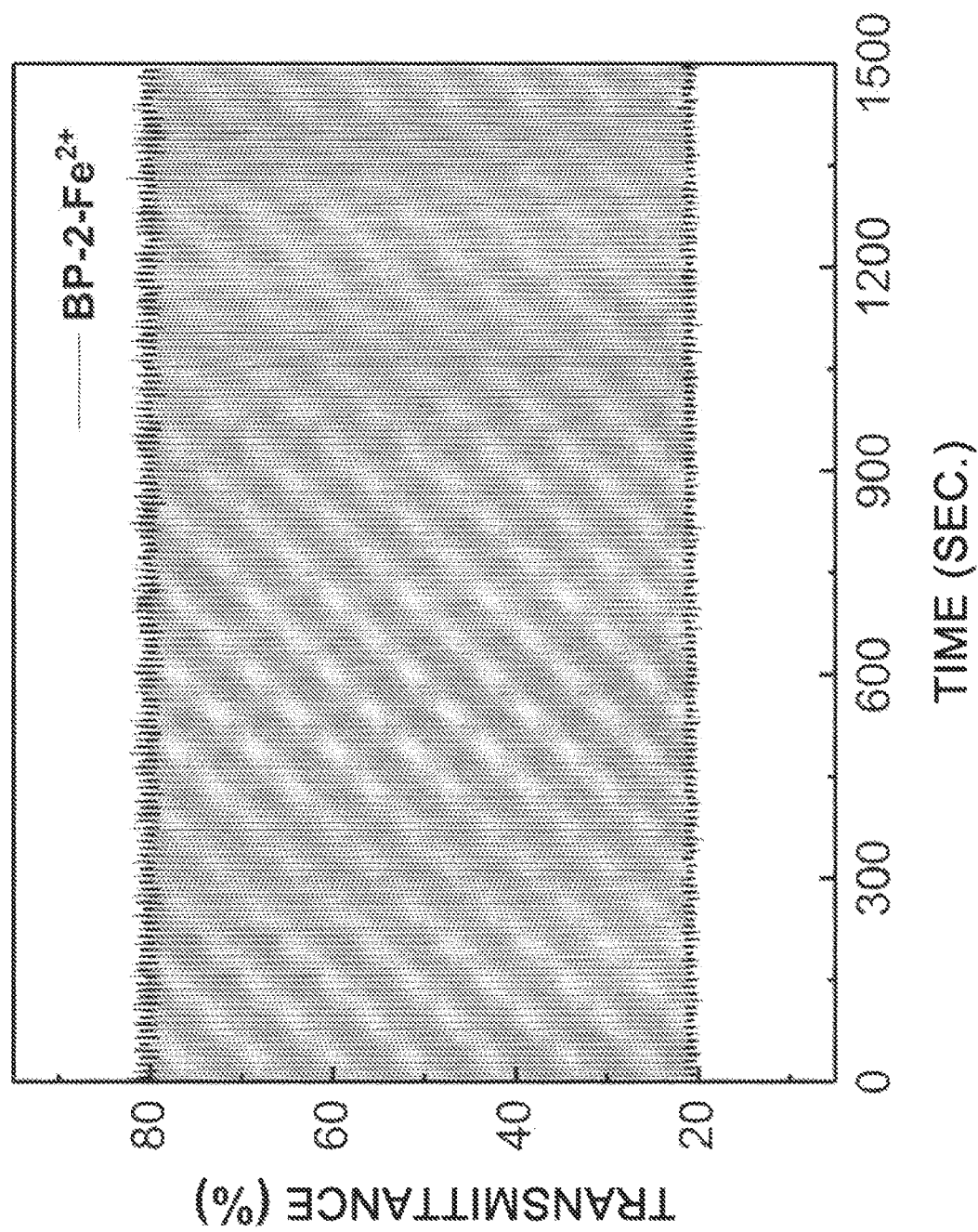
FIG. 17 shows the transmitted light intensity of the composition 2 when peak intensity switching was repeated 300 times.

When the peak intensity switching was repeated a plurality of times (300 times), the transmitted light intensity of Composition 1 and the transmitted light intensity of Composition 2 were shown in FIG. 16 and FIG. 17, respectively.

From these results, it was found that none of the compositions had any change in transmitted light intensity and response rate even when color development and decolorization were repeated, but they had excellent durability (excellent fatigue resistance).

The results obtained from the above experiments are summarized in Table 1.

TABLE 1

| Nanosheets | ΔT [%] | $t_{coloring}$ [s] | $t_{bleaching}$ [s] | charge/discharge [mC] | η [cm²/C] |
|---|---|---|---|---|---|
| BP-1-Fe$^{2+}$ | 57 | 0.57 | 0.65 | 1.24/1.17 | 382 |
| BP-2-Fe$^{2+}$ | 59 | 0.51 | 0.58 | 1.30/1.22 | 442 |

Note that, in Table 1, "ΔT" is as already explained, "$t_{coloring}$" is the response rate for color development, "$t_{bleaching}$" is the response speed for decolorization, "charge/discharge" is the injected/ejected charge, and a represents the coloring efficiency.

The coloring efficiency represents ΔOD (change in optical density) per amount of electric charge injected into a unit area, and can be calculated from the area of the film and the measured value as described above.

In Table 1, "BP-1-Fe$^{2+}$" corresponds to Composition 1, and "BP-2-Fe$^{2+}$" corresponds to Composition 2.

Figure 19:
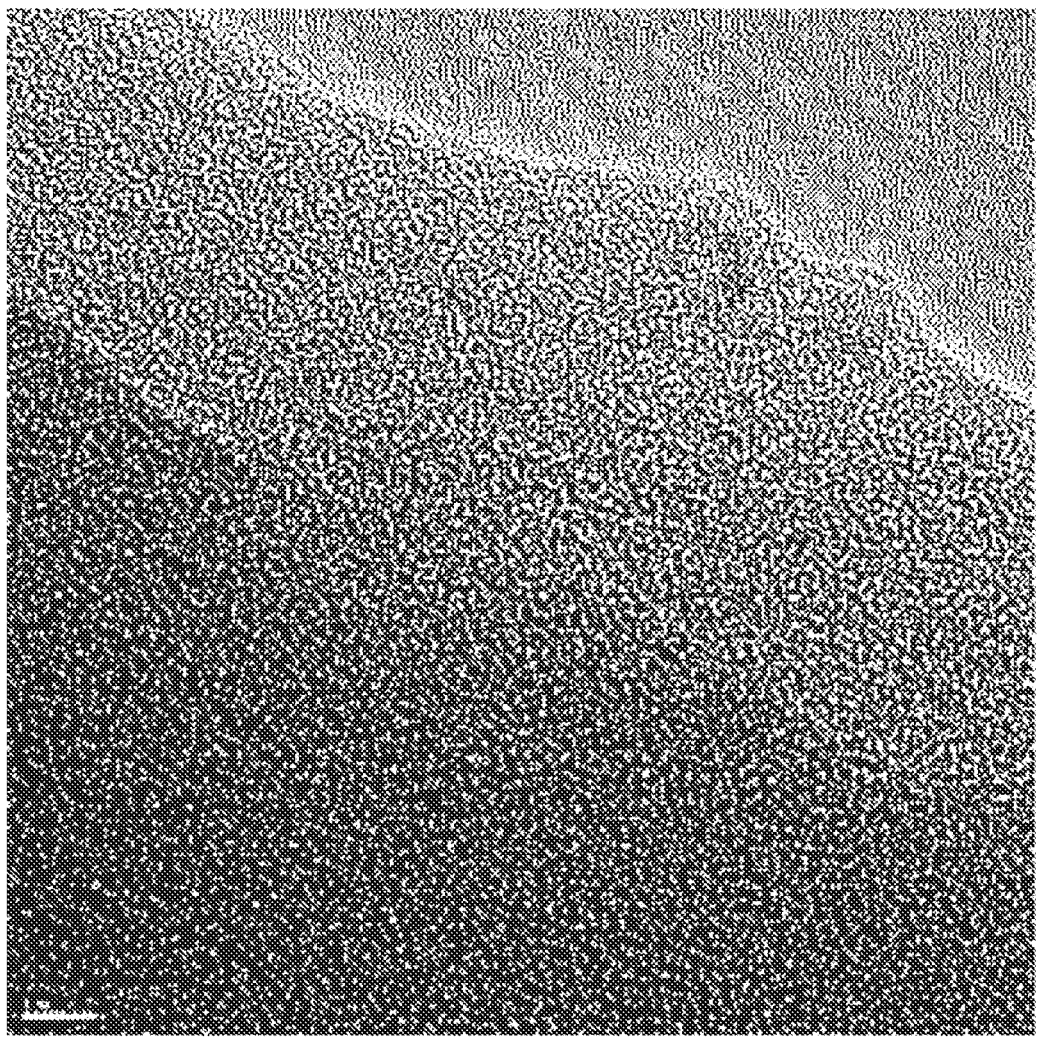
FIG. 19 is a transmission electron microscope image of the composition 1.

FIGS. 18 and 19 show the scanning electron microscope and transmission electron microscope images of Composition 1 obtained by the following method.

Figure 21:
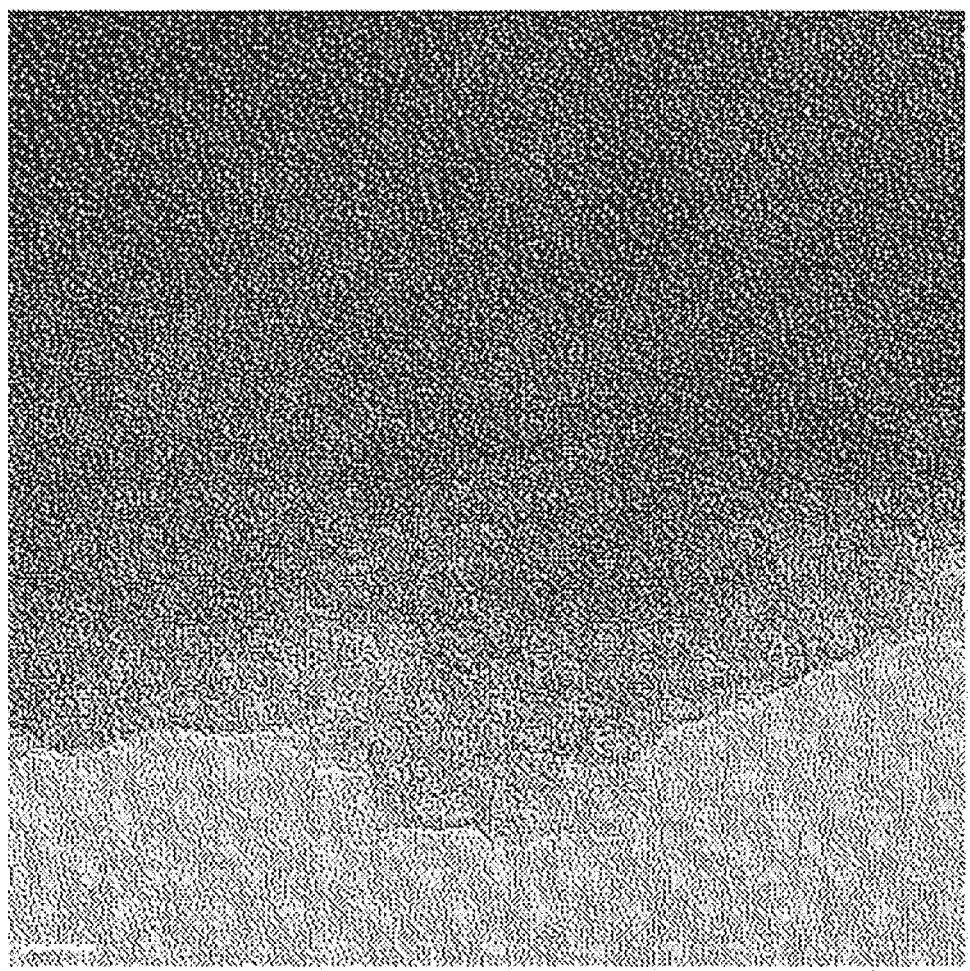
FIG. 21 is a transmission electron microscope image of the composition 2.

Further, FIGS. 20 and 21 show scanning electron microscope and transmission electron microscope images of Composition 2 obtained by the following method.

From the above results, it was found that each of Composition 1 and Composition 2 had a structure in which a plurality of sheet structures was stacked (nanosheet structure). This is assumed to be due to the fact that the polymer according to one embodiment of the present invention is a polymer formed by coordinating a predetermined compound A to a specific metal ion, and thus is more easily arranged two-dimensionally.

The composition containing the polymer according to one embodiment of the present invention having such a structure exhibits excellent organic solvent resistance.

Comparative Example

In a 100 ml two-necked flask, 1,4-bis(terpyridine)benzene (30 mg, 0.054 mol) as a ligand was dissolved in 25 ml of acetic acid while heating. Next, 5 ml of a methanol solution containing iron acetate (9.39 mg, 0.054 mol) was added to the two-necked flask, and a mixture was obtained. The mixture was heated to reflux at 150° C. for 24 hours in a nitrogen atmosphere.

After refluxing, the reaction solution in the two-necked flask was transferred to a petri dish and dried in the air to obtain Polymer C that was a purple powder polymer. The yield of the powder was 90%.

A film was formed on the ITO electrode using Polymer C and the state was changed to a decolorized state. The formed film looked white and cloudy, and it was found that the effect desired by the present application was not obtained.

Specifically, each of the above evaluations was carried out by the following method.

(Ultraviolet-Visible Spectroscopic Measurement)

Absorption spectra were recorded using a Shimadzu UV-2550 UV-visible spectrophotometer.

A DCM solution (5×10$^{-6}$ M) was used for ligands BP-1 and BP-2, and Composition 1 having a nanosheet shape and Composition 2 having a nanosheet shape were measured on an ITO substrate.

(Scanning Electron Microscope (SEM) and Transmission Electron Microscope (TEM) Observation)

The nanosheets of Polymer 1 and Polymer 2 were sputter-coated using a platinum coater (E-1030 Ion Sputter, Hitachi, Ltd., Tokyo, Japan), and then observed with a scanning electron microscope (SEM) 58000 (manufactured by Hitachi, Ltd.) operating at 10 kV. Samples for FE-SEM were prepared by dropping a suspension of polymer flakes (containing a counter anion) in DCM and ethanol (1:1) onto the surface of freshly cleaved mica. Transmission electron microscopic (TEM) analyses were carried out using JEOL JEM 2100F HRTEM. Samples for TEM were prepared by drop-casting a DCM and ethanol (1:1) suspension of polymer flakes onto a 150-mesh carbon-coated copper grid and drying it under vacuum overnight.

(Infrared (IR) Spectroscopy)

FT-IR measurements were performed by a Nicolet 4700 FT-IR spectrophotometer equipped with a Mercury-Cadmium Telluride (MCT) detector, and transmittance measurements were monitored using KBr tablets.

(Evaluations of Electrochemistry and Electrochromic Properties)

All electrochemical experiments, including cyclic voltammetry (CV) and amperometry measurements, were performed using an ALS/CHI electrochemical workstation (CH Instruments, Inc.). For CV measurement, a conventional 3-electrode system (an ITO substrate as a working electrode, a platinum flag as a counter electrode, and a nanosheet on which Ag/AgCl was deposited as a reference electrode) was used.

(Powder X-Ray Diffraction (PXRD))

The powder X-ray diffraction (PXRD) patterns of the sheet containing Polymer 1 (BP-1-Fe$^{2+}$) and the sheet containing Polymer 2 (BP-2-Fe$^{2+}$) were measured by the Rigaku RINT 1200 diffractometer with an operating voltage of 40 kV and Ni-filtered CuKα rays (λ=1.5418 angstroms) with a beam current of 30 mA.

Figure 22:
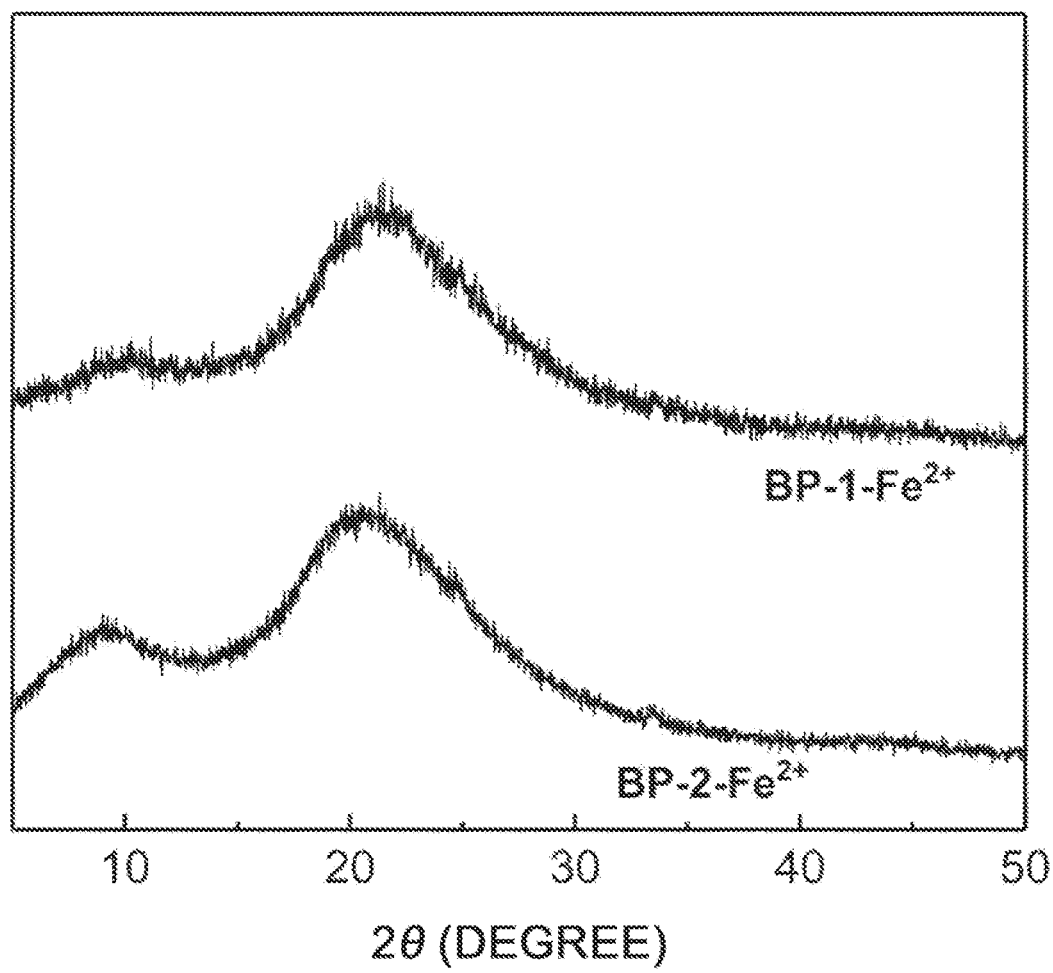
FIG. 22 shows powder X-ray diffraction patterns of the composition 1 and the composition 2.

The results are shown in FIG. 22. From these results, it was found that the sheet containing Polymer 1 (BP-1-Fe$^{2+}$) and the sheet containing Polymer 2 (BP-2-Fe$^{2+}$) were amorphous.

REFERENCE SIGNS LIST

100 Electrochromic element
101 First transparent electrode
102 Composition layer
103 Polymer solid electrolyte
104 Second transparent electrode

The invention claimed is:

1. A polymer, comprising a complex in which compounds A represented by formula (1) are bound to at least one specific metal ion selected from the group consisting of a first metal ion having a coordination number of 4, a second metal ion having a coordination number of 6, and a third metal ion having coordination numbers of 4 and 6:

$$BP_1\text{-}L_1\text{-}BP_2 \tag{1}$$

wherein $L_1$ represents a single bond or a divalent group, and $BP_1$ and $BP_2$ each independently represent a bipyridine derivative, which may be identical to or different from each other, provided that when at least one of hydrogen atoms bonded to carbon atoms of the bipyridine derivative is substituted with a monovalent group, the monovalent group does not include a pyridyl group, and wherein the complex is formed in such a manner that one of the $BP_1$ and $BP_2$ of one of the compounds A is bound to one of the $BP_1$ and $BP_2$ of another one of the compounds A via the specific metal ion, by which the compounds A are continuously bound to each other.

2. The polymer according to claim 1, wherein the compounds A are each represented by formula (2) below:

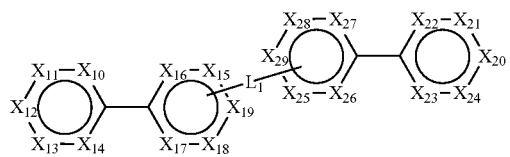

(2)

wherein, one of $X_{10}$ to $X_{14}$ is N, four of $X_{10}$ to $X_{14}$ are CR, one of $X_{15}$ to $X_{19}$ is N, one of $X_{15}$ to $X_{19}$ is a carbon atom bonded to $L_1$, three of $X_{15}$ to $X_{19}$ are CR, one of $X_{20}$ to $X_{24}$ is N, the rest four of $X_{20}$ to $X_{24}$ are CR, one of $X_{25}$ to $X_{29}$ is N, another one of $X_{25}$ to $X_{29}$ is a carbon atom bonded to $L_1$, three of $X_{25}$ to $X_{29}$ are CR, R is a hydrogen atom or a monovalent group other than a pyridyl group, and $L_1$ is a single bond or a divalent group.

3. The polymer according to claim 2, comprising at least one substructure selected from the group consisting of a repeating unit represented by formula (4) and a partial structure represented by formula (5):

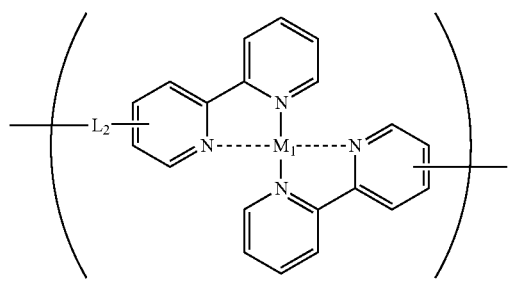

(4)

wherein $M_1$ represents at least one selected from the group consisting of the first metal ion and the third metal ion, which are metal ions in a state having a coordination number of 4, $L_2$ represents a single bond or a divalent group, a plurality of $L_2$ and $M_1$ are identical to or different from each other, and hydrogen atoms in the repeating unit represented by formula (4) are each optionally independently substituted with a monovalent group other than a pyridyl group;

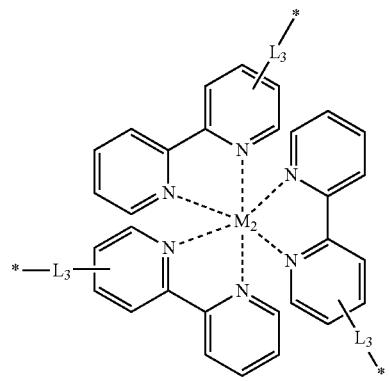

(5)

wherein $M_2$ represents at least one selected from the group consisting of the second metal ion and the third metal ion, which are metal ions in a state having a coordination number of 6, $L_3$ represents a single bond or a divalent group, * represents a bonding position, and a plurality of $M_2$ and $L_3$ are identical to or different from each other, and hydrogen atoms in the repeating unit represented by formula (5) are each optionally independently substituted with a monovalent group other than a pyridyl group.

4. The polymer according to claim 1, comprising at least one substructure selected from the group consisting of a repeating unit represented by formula (4) and a partial structure represented by formula (5):

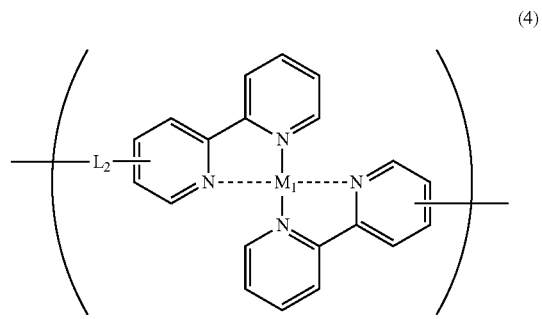

(4)

wherein $M_1$ represents at least one selected from the group consisting of the first metal ion and the third metal ion, which are metal ions in a state having a coordination number of 4, $L_2$ represents a single bond or a divalent group, a plurality of $L_2$ and $M_1$ are identical to or different from each other, and hydrogen atoms in the repeating unit represented by formula (4) are each optionally independently substituted with a monovalent group other than a pyridyl group;

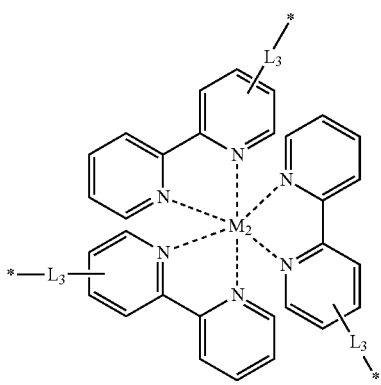

(5)

wherein $M_2$ represents at least one selected from the group consisting of the second metal ion and the third metal ion, which are metal ions in a state having a coordination number of 6, $L_3$ represents a single bond or a divalent group, * represents a bonding position, and a plurality of $M_2$ and $L_3$ are identical to or different from each other, and hydrogen atoms in the repeating unit represented by formula (5) are each optionally independently substituted with a monovalent group other than a pyridyl group.

5. A composition comprising: the polymer according to claim 4; and a counterion.

6. A composition comprising: the polymer according to claim 1; and a counterion.

7. An electrochromic element comprising:
a pair of electrodes arranged to face each other, at least one of which is transparent; and
a composition layer formed from the composition according to claim 4 arranged between the pair of electrodes.

8. The electrochromic element according to claim 7, further comprising a solid electrolyte layer between one of the electrodes and the composition layer.

9. A light control device comprising the electrochromic element according to claim 8, wherein both of the pair of electrodes are transparent.

10. A display device comprising the electrochromic element according to claim 8.

11. A light control device comprising the electrochromic element according to claim 7, wherein both of the pair of electrodes are transparent.

12. A display device comprising the electrochromic element according to claim 7.

* * * * *